(12) United States Patent
Yukawa et al.

(10) Patent No.: US 7,906,193 B2
(45) Date of Patent: Mar. 15, 2011

(54) RETROREFLECTIVE SHEET

(75) Inventors: Shigeo Yukawa, Wakayama (JP); Yasuyoshi Iwamoto, Wakayama (JP)

(73) Assignee: Kiwa Chemical Industry Co., Ltd., Wakayama (JP)

( * ) Notice: Subject to any disclaimer, the term of this patent is extended or adjusted under 35 U.S.C. 154(b) by 967 days.

(21) Appl. No.: 10/534,412

(22) PCT Filed: Nov. 10, 2003

(86) PCT No.: PCT/JP03/14288
§ 371 (c)(1),
(2), (4) Date: May 11, 2005

(87) PCT Pub. No.: WO2004/048079
PCT Pub. Date: Jun. 10, 2004

(65) Prior Publication Data
US 2006/0057323 A1    Mar. 16, 2006

(30) Foreign Application Priority Data
Nov. 27, 2002    (JP) .................................. 2002-344597

(51) Int. Cl.
*B32B 33/00*    (2006.01)
(52) U.S. Cl. ......................... 428/41.8; 428/144; 428/173
(58) Field of Classification Search ................. 428/40.1, 428/40.2, 40.4, 41.7, 41.8, 42.1, 141, 142, 428/148, 156, 144, 173
See application file for complete search history.

(56) References Cited

U.S. PATENT DOCUMENTS

| | | | |
|---|---|---|---|
| 4,340,273 A | 7/1982 | Jack et al. | |
| 5,069,964 A * | 12/1991 | Tolliver et al. | 428/325 |
| 5,415,911 A | 5/1995 | Zampa et al. | |
| 6,326,072 B1 * | 12/2001 | Ojeda et al. | 428/40.1 |
| 2002/0004135 A1 * | 1/2002 | Buccellato et al. | 428/355 AC |
| 2002/0155276 A1 | 10/2002 | Owusu et al. | |

FOREIGN PATENT DOCUMENTS

| | | |
|---|---|---|
| JP | 8-43615 A | 2/1996 |
| JP | 8-100155 A | 4/1996 |
| JP | 2000-329918 A | 11/2000 |
| JP | 2002-317156 A | 10/2002 |
| JP | 2003-213228 A | 7/2003 |

OTHER PUBLICATIONS

Search Report of the corresponding European Patent Application Number (EP 03 81 1892) mailed on Jan. 24, 2008.

* cited by examiner

*Primary Examiner* — Alicia Chevalier
(74) *Attorney, Agent, or Firm* — Westerman, Hattori, Daniels & Adrian, LLP

(57) ABSTRACT

An original sheet of a retroreflective sheet includes plural glass beads with a metal reflective layer provided on lower hemisphere surfaces thereof, a resin support sheet for supporting the glass beads, and a transparent cover film disposed on a surface side of the resin support sheet, wherein the resin support sheet and the cover film are connected to each other by heat press emboss forming from a rear face of the resin support sheet so as to form the original sheet of the retroreflective sheet, and a retroreflective sheet laminate includes a pressure-sensitive adhesive layer and a resin release film for covering the pressure-sensitive adhesive layer on a rear side of the original sheet of the retroreflective sheet. An embossed groove by heat press emboss forming was filled with a part of the pressure-sensitive adhesive layer, a residual rate of the pressure-sensitive adhesive layer ranges between 10% and 50% inclusive, and a fall time of the pressure-sensitive adhesive layer ranges between 10 hours and 150 hours inclusive.

15 Claims, 8 Drawing Sheets

RETROREFLECTIVE SHEET

TECHNICAL FIELD

The present invention relates to a retroreflective sheet used for traffic signs, guide signs, sign boards for safety guidance, or other safety signs.

BACKGROUND ART

Retroreflective sheets are widely used mainly for traffic safety purposes such as traffic signs, guide signs, warning signs, restriction signs. The retroreflective sheet includes plural retroreflective elements, a resin support sheet, a transparent cover film disposed on a surface side of the resin support sheet and a pressure-sensitive adhesive layer on a rear face side of the resin support sheet. The retroreflective element is supported by at least one of the resin support sheet and the cover film, and the resin support sheet and the cover film are connected to each other by heat press emboss forming from the rear face of the resin support sheet so as to form a connection part. A groove of the connection part is formed on the rear face side of the resin support sheet. A release film is further laminated to the retroreflective sheet. For the release film, a release material, such as a polyester film, a polyethylene laminated paper, polypropylene and polyethylene, coated with a release agent such as a silicon compound and a fluorine compound, may be used. For a pressure-sensitive adhesive for forming the pressure-sensitive adhesive layer, a solvent-type pressure-sensitive adhesive, an emulsion-type pressure-sensitive adhesive, and a pressure-sensitive adhesives that can be cured by electron beams or ultraviolet rays, or the like may be used, for example. Such a retroreflective sheet is adhered to a substrate such as a metal substrate like aluminum, a steel plate, a coated steel plate and a stainless steel plate; a plastic substrate like a fiber reinforced plastic (FRP) and a rigid vinyl chloride; and a composite substrate including aluminum plates sandwiching polyethylene or the like, by using an adhesion device or an adhesion machine such as a squeegee, a hand roll and a mangle roll, so as to be used as a display board, a signboard or the like (see JP3278299 and JP2000-329918A, the contents of which are incorporated by reference).

However, when adhering the retroreflective sheet to the substrate, unless air trapped between the substrate and the retroreflective sheet is expelled, the air is enclosed between the substrate and the retroreflective sheet. In this case, when a temperature of the substrate increases due to sunlight or the like, the enclosed air expands, and accordingly a trouble such as blisters, bubbles, wrinkles and exfoliations may occur to the retroreflective sheet. In order to prevent this, when adhering the retroreflective sheet to the substrate, it is necessary to apply some pressure so as to expel the air trapped between the substrate and the retroreflective sheet. In addition, in the case where the retroreflective sheet in a distorted state is adhered to the substrate, problems such as blisters, bubbles, wrinkles, exfoliations or the like occur over the course of time due to a residual stress inside the retroreflective sheet.

DISCLOSURE OF THE INVENTION

However, any effective measures have not been taken against this problem. According to the above-cited JP3278299, for example, a retroreflective sheet for a gas-generating adherend is proposed for preventing the blisters of the retroreflective sheet. This retroreflective sheet for a gas-generating adherend includes a pressure-sensitive adhesive for forming a pressure-sensitive adhesive layer, which is made of a resin obtained by a cross-linking reaction to cross-linking resins having a weight-average molecular weight of 500,000 or more, the holding power is 10 mm/1000 min or less at 100° C., and a wetting with respect to a polycarbonate resin plate is 50% or more after 30 minutes from adhesion. Actually, however, even by using the pressure-sensitive adhesive satisfying this condition to prevent the blisters and the like of the retroreflective sheet, the above-mentioned problem was not solved sufficiently.

In addition, JP2000-329918A proposes use of the groove of the resin support sheet, which is formed during heat press emboss forming, for discharging the air. However, when the retroreflective sheet is used outdoors as a sign board, contaminants such as water, dirt, dusts may intrude in the groove, degrading a sticking property, and troubles such as exfoliations and peeling of the sheet may occur. In order to prevent these troubles, it is necessary to expel the air in the groove at the time of adhesion of the retroreflective sheet, and to fill the groove with a pressure-sensitive adhesive layer. For this purpose, it is necessary to lower a cohesive power of the pressure-sensitive adhesive so that the pressure-sensitive adhesive layer may enter the groove easily. Whereas, in the case where the retroreflective sheet is distorted at the time of its adhesion, a residual stress in the retroreflective sheet may cause blisters, bubbles, wrinkles, exfoliations and the like to the sheet over the course of time. However, because the cohesive power of the pressure-sensitive adhesive is lowered, the retroreflective sheet cannot resist this stress, thereby causing cohesive failure of the pressure-sensitive adhesive. Consequently, the retroreflective sheet cannot stop its movement caused by the residual stress, so that blisters, bubbles, wrinkles, exfoliations or the like occur in the retroreflective sheet. In the light of these conditions, development of a new retroreflective sheet which is prevented from the occurrence of blisters, bubbles, wrinkles, exfoliations or the like has been desired in the market.

In order to solve the above-stated conventional problem, the present invention has an object to provide a retroreflective sheet that can be prevented from an appearance abnormality such as blisters, bubbles, wrinkles, exfoliations, which may occur over the course of time after the adhesion to a substrate.

In order to attain the above-mentioned object, the retroreflective sheet of the present invention includes plural retroreflective elements, a resin support sheet, a transparent cover film disposed on a surface side of the resin support sheet, and a pressure-sensitive adhesive layer formed on a rear face side of the resin support sheet, wherein the retroreflective element is held in at least one of the resin support sheet and the cover film, the resin support sheet and the cover film are connected to each other by heat press emboss forming from the rear face side of the resin support sheet so as to form a connection part, a groove of the connection part is formed on the rear face side of the resin support sheet, the groove is filled with a part of the pressure-sensitive adhesive layer, a residual rate of the pressure-sensitive adhesive layer ranges between 10% and 50% inclusive, and a fall time of the pressure-sensitive adhesive layer ranges between 10 hours and 150 hours inclusive: where residual rate (%)=(a residual displacement÷an initial displacement)×100, the initial displacement represents a displacement (mm) between a flat plate and the retroreflective sheet measured by a Yamamoto's cohesion tester, which occurs after 5 minutes from steps of: pressing the retroreflective sheet with a size of 10 mm×5 mm onto the mirror-surfaced flat plate of a SUS304 steel plate specified by JISG 4305 with a width of 5 mm, using a pressing device specified by JIS Z 0237; adding loads of 17 g respectively to both ends of the retroreflective sheet via strings immediately after the pressing; and further applying a measurement load of 200 g to one of the loads, the residual displacement represents a displacement occurring between the flat plate and the retroreflective sheet after 10 minutes from removal of the load of 200 g, and the fall time represents a fall time of the retroreflective sheet with a load of 9.8 N imposed in a holding power test at 40° C. in accordance with a JISZ0237 holding power test.

A method for manufacturing a laminate of a heat-resistant release material and the retroreflective sheet of the present invention includes steps of: preparing an original sheet of a retroreflective sheet including plural retroreflective elements, a resin support sheet, and a transparent cover film disposed on a surface side of the resin support sheet, in which the retroreflective element is held in at least one of the resin support sheet and the cover film, the resin support sheet and the cover film are connected to each other by heat press emboss forming from a rear face of the resin support sheet so as to form a connection part, and a groove of the connection part is formed on the rear face side of the resin support sheet; forming a pressure-sensitive adhesive layer on the heat-resistant release material; and disposing the heat-resistant release material with the pressure-sensitive adhesive layer formed thereon on the rear face side of the original sheet of the retroreflective sheet, adhering them to each other by inter-roll line pressure ranging between 100 N/cm and 800 N/cm inclusive at a roll surface temperature ranging between 50° C. and 90° C. inclusive from a heat-resistant release material side, so that the groove of the resin support sheet is filled with a part of the pressure-sensitive adhesive layer.

BEST MODE FOR CARRYING OUT THE INVENTION

Figure 1:
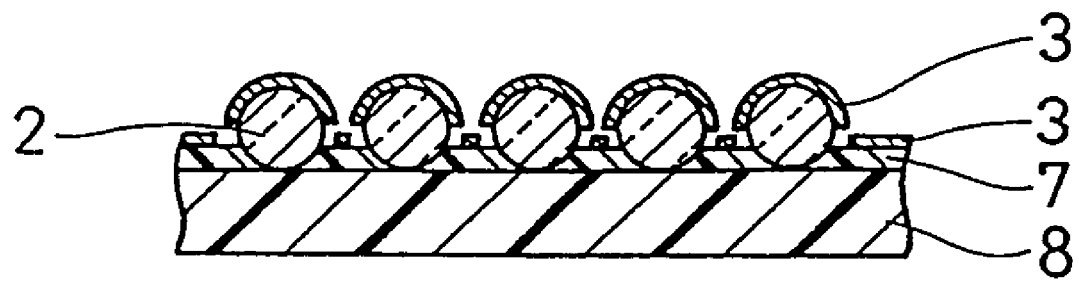
FIG. 1 is a cross-sectional view showing a process of forming a reflective layer on glass beads, according to an example of the manufacturing method of the present invention.

The retroreflective sheet of the present invention can be prevented from an appearance abnormality which occurs over the course of time after adhesion to a substrate.

The inventors of the present invention found that, by reducing the air remaining between the retroreflective sheet and the substrate when the retroreflective sheet is adhered, the appearance abnormality of the retroreflective sheet, which occurs over the course of time after the adhesion to the substrate, can be prevented. They also found that, even when the retroreflective sheet is adhered in a distorted state, the appearance abnormality of the retroreflective sheet can be prevented by relaxing a residual stress in the retroreflective sheet by a pressure-sensitive adhesive layer that is disposed on a rear face side of the resin support sheet.

The inventors also found that the air remaining at the time of adhesion of the retroreflective sheet can be reduced, and the residual stress in the retroreflective sheet after the adhesion can be relaxed by: (1) filling a groove formed during heat press emboss forming, with a pressure-sensitive adhesive layer in advance; (2) specifying a residual rate of the pressure-sensitive adhesive layer in a specific range, which is obtained by a residual displacement and an initial displacement using a Yamamoto's cohesion tester; and (3) specifying a fall time of the pressure-sensitive adhesive layer in a specific range, thereby leading to the present invention.

The retroreflective sheet of the present invention will be described below further in detail.

In the retroreflective sheet of the present invention, a thickness of the pressure-sensitive adhesive layer at a part where the groove is not formed on the rear face side of the resin support sheet preferably ranges between 20 μm and 110 μm inclusive, more preferably ranges from 30 μm to 100 μm, particularly preferably ranges from 40 μm to 90 μm. When the thickness is 20 μm or more, the groove of the resin support sheet may be filled with a part of the pressure-sensitive adhesive layer, the thickness is sufficient to uniformalize the thickness of the whole pressure-sensitive adhesive layer, and a sufficient adhesive property can be obtained. When the thickness is 110 μm or less, run of the pressure-sensitive adhesive can be prevented, in particular, a run of the pressure-sensitive adhesive from edges, and adhesion of the pressure-sensitive adhesive to slitter blade are prevented when cutting the sheet into a standard size by a slitter, and furthermore, cohesive failure of the pressure-sensitive adhesive hardly occurs.

In the retroreflective sheet of the present invention, a filling factor of the pressure-sensitive adhesive layer in the groove is preferably 50% or more.

The filling factor (%)=[(A−B)÷A]×100

The letter A denotes an area of the groove per unit area of the retroreflective sheet, and the letter B denotes an area of an opening gap formed on an interface between the groove and the pressure-sensitive adhesive layer per unit area of the retroreflective sheet.

Note here that the above-mentioned "fill" means a state where the groove is filled with a part of the pressure-sensitive adhesive layer. The filling factor is preferably 60% or larger, and more preferably 70% or larger. When the filling factor is 50% or larger, air between the retroreflective sheet and the substrate can be exhaled sufficiently at the time of the adhesion of the retroreflective sheet to the substrate.

In the retroreflective sheet of the present invention, the residual rate ranges between 10% and 50% inclusive, preferably ranges between 15% and 45% inclusive, more preferably ranges between 20% and 40% inclusive. The residual rate represents a stress relaxation property of the pressure-sensitive adhesive layer. When the residual rate is in the range between 10% and 50% inclusive, an residual internal stress in the retroreflective sheet is relaxed by the pressure-sensitive adhesive layer at the time of the adhesion of the retroreflective sheet, thus preventing an appearance abnormality that occurs over the course of time, such as wrinkles, blisters, bubbles and exfoliations.

In the retroreflective sheet of the present invention, the fall time ranges between 10 hours and 150 hours inclusive, preferably ranges between 20 hours and 140 hours inclusive, more preferably ranges between 40 hours and 130 hours inclusive. The fall time represents a cohesive power of the pressure-sensitive adhesive layer. When the fall time is 10 hours or longer, the cohesive power of the pressure-sensitive adhesive layer is strong enough to resist a shrinkage stress of the retroreflective sheet, so that the retroreflective sheet is not shrunk. Moreover, when the fall time is 150 hours or shorter, since the cohesive power of the pressure-sensitive adhesive is not too high, a residual internal stress in the retroreflective sheet is relaxed by the pressure-sensitive adhesive layer by the time when the retroreflective sheet is actually used, so that the occurrence of wrinkles, blisters, bubbles, exfoliations and the like in a main body of the retroreflective sheet can be prevented after the application of the retroreflective sheet.

In the retroreflective sheet of the present invention, the residual rate and the fall time of the pressure-sensitive adhesive layer are preferably the same as a residual rate and a fall time measured when the retroreflective sheet is actually used, or a residual rate and a fall time measured after steps of forming the pressure-sensitive adhesive layer on the rear face side of the resin support sheet and performing aging treatment at a temperature of 23±2° C. and a relative humidity of 65±5% for 7 days.

Moreover, in the retroreflective sheet of the present invention, the residual rate and the fall time of the pressure-sensitive adhesive layer are preferably the same as a residual rate and a fall time measured after steps of forming the pressure-sensitive adhesive layer on the rear face side of the resin support sheet, performing the above-stated aging treatment, and further performing aging treatment at a temperature of 50° C. and a relative humidity of 65±5% for 10 days.

The pressure-sensitive adhesive layer of the present invention is preferably formed of a resin such as an acrylic resin and a rubber-based resin. For the acrylic resin, in particular, a polymer-based acrylic resin containing at least one of an acrylic ester copolymer and an acrylic prepolymer as a main component, or a modified acrylic resin obtained by adding, to the acrylic resin, a tackifier and a monomer for providing a cohesive power.

Examples of the rubber-based resin include a natural rubber and a synthetic rubber such as an isoprene rubber, a styrene-butadiene block copolymer, a styrene-isoprene-styrene block copolymer, a butyl rubber, a styrene-ethylene-butylene-styrene copolymer, a polyisobutylene, a polyvinyl isobutyl ether, a chloroprene rubber, and a nitrile rubber.

To these rubber-based resins, for example, a natural resin such as a rosin, a modified rosin, derivatives of a rosin and a modified rosin, a terpenephenol resin, a polyterpene resin, a modified terpene, an aliphatic hydrocarbon resin, a cyclopentadiene resin, an aromatic petroleum resin, a phenol resin, an alkylphenol-acetylene resin, a coumarone-indene resin, a tackifier such as a vinyltoluene-α-methylstyrene copolymer, various plasticizers, an antioxidant, a stabilizer, a softener such as oil, a filler, a stabilizer, a pigment, a colorant, and the like may be added as necessary. They also may be used in combination of two or more as necessary.

Examples of the acrylic resin include a polymer or a copolymer of an acrylic vinyl monomer having an alkyl group, a hydroxyl group, an epoxy group, an alkoxy group, a phenoxy group, an oxyethylene group, an amino group, an amide group, a carboxyl group, a halogen atom, a phosphate group, a sulfonic group, an urethane group, a phenyl group, a benzyl group, a tetrahydrofurfuryl group or the like, and a copolymer of acrylic vinyl monomers and other copolymerizable monomers.

Examples of the acrylic vinyl monomer having an alkyl group include methyl(meth)acrylate, ethyl(meth)acrylate, isopropyl(meth)acrylate, lauryl(meth)acrylate, stearyl(meth)acrylate, butyl(meth)acrylate, hexyl(meth)acrylate, cyclohexyl(meth)acrylate, 2-ethylhexyl(meth)acrylate, isoamyl(meth)acrylate, isooctyl(meth)acrylate, n-octyl(meth)acrylate, dodecyl(meth)acrylate, isobutyl(meth)acrylate and the like.

Examples of the acrylic vinyl monomer having a hydroxyl group include 2-hydroxyethyl(meth)acrylate, 2-hydroxypropyl(meth)acrylate, 2-hydroxybutyl(meth)acrylate, 3-chloro-2-hydroxypropyl(meth)acrylate and the like.

Examples of the acrylic vinyl monomer having an epoxy group include glycidyl(meth)acrylate, methylglycidyl(meth)acrylate and the like.

Examples of the acrylic vinyl monomer having an alkoxy group include methoxyethyl(meth)acrylate, ethoxyethyl(meth)acrylate, butoxyethyl(meth)acrylate and the like.

Examples of the acrylic vinyl monomer having a phenoxy group include phenoxyethyl(meth)acrylate and the like.

Examples of the acrylic vinyl monomer having an oxyethylene group include diethyleneglycol(meth)acrylate, methoxydiethyleneglycol(meth)acrylate, methoxypolyethyleneglycol(meth)acrylate, phenoxydiethyleneglycol(meth)acrylate, phenoxypolyethyleneglycol(meth)acrylate and the like.

Examples of the acrylic vinyl monomer having an amino group include dimethylaminoethyl(meth)acrylate, diethylaminoethyl(meth)acrylate, N-tert-butylaminoethyl(meth)acrylate, methacryloyloxyethyltrimethylammoniumchloride (meth)acrylate and the like.

Examples of the acrylic vinyl monomer having an amide group include (meth)acrylamide, N-methylol(meth)acrylamide, N-methoxymethyl(meth)acrylamide, N,N'-methylenebis(meth)acrylamide and the like.

Examples of the acrylic vinyl monomer having a carboxyl group include acrylic acid, methacrylic acid, 2-methacryloyloxy succinic acid, 2-methacryloyloxyethyl maleic acid, 2-methacryloyloxyethylphthalic acid, 2-methacryloyloxyethylhexahydrophthalic acid and the like.

Examples of the acrylic vinyl monomer having a halogen atom include trifluoroethyl(meth)acrylate, pentadecafluorooxyethyl(meth)acrylate, 2-chloroethyl(meth)acrylate, 2,3-dibromopropyl(meth)acrylate, tribromophenyl(meth)acrylate and the like.

Examples of the acrylic vinyl monomer having a phosphate group include 2-methacryloyloxyethyldiphenylphosphate (meth)acrylate, trimethacryloyloxyethylphosphate(meth) acrylate, triacryloyloxyethylphosphate(meth)acrylate and the like.

Examples of the acrylic vinyl monomer having a sulfonic group include sodium sulfopropyl(meth)acrylate, sodium 2-sulfoethyl(meth)acrylate, sodium 2-acrylamide-2-methyl-propanesulphonate and the like.

Examples of the acrylic vinyl monomer having an urethane group include urethane(meth)acrylate and the like.

Examples of the acrylic vinyl monomer having a phenyl group include phenyl(meth)acrylate, p-tert-butylphenyl (meth)acrylate, o-biphenyl(meth)acrylate and the like.

Examples of the acrylic vinyl monomer having a benzil group include benzil(meth)acrylate and the like.

Examples of the acrylic vinyl monomer having a tetrahydrofurfuryl group include tetrahydrofurfuryl(meth)acrylate and the like.

Examples of other monomers having the capability of copolymerization include vinyl monomers having a silane group, styrene, chlorostyrene, α-methylstyrene, vinyltoluene, vinyl chloride, vinyl acetate, vinyl propionate, a vinyl alkylate compound (trade name: VEOVA 10, manufactured by Shell Chemicals Limited), acrylonitrile, vinyl pyridine and the like.

Examples of the vinyl monomers having silane groups include vinyltrimethoxysilane, vinyltriethoxysilane, vinyltris (β-methoxyethyl)silane, vinyltriacetylsilane, methacryloyloxypropyltrimethoxysilane and the like.

In addition, examples of the other monomers having the capability of copolymerization include, ethyleneglycoldi (meth)acrylate, diethyleneglycoldi(meth)acrylate, triethyleneglycoldi(meth)acrylate, dipropyleneglycoldi(meth)acrylate, 1,3-butyleneglycoldi(meth)acrylate, trimethylolpropanetri(meth)acrylate, tetramethylolmethanetetra(meth)acrylate, divinylbenzene, N,N'-methylenebisacrylamide, 1,4-buthanedioldi(meth)acrylate, 1,6-hexanedioldi(meth)acrylate and the like. These monomers can be used at an extent to which coating suitability may not be degraded.

Moreover, as various additives, for example, a natural resin such as a rosin, a modified rosin, derivatives of a rosin or a modified rosin, a polyterpene resin, a modified terpene, a terpenephenol resin, an aliphatic hydrocarbon resin, a cyclopentadiene resin, an aromatic petroleum resin, a phenol resin, an alkylphenol-acetylene resin, a coumarone-indene resin, a tackifier such as a vinyltoluene-α-methylstyrene copolymer, various plasticizers, an antioxidant, a stabilizer, a softner such as oil, a filler, a colorant, a pigment or the like can be added to the acrylic resin as necessary. They also may be used in combination of two or more as necessary.

The above-noted acrylic resins are manufactured by polymerization using any one of conventionally known methods such as a bulk polymerization method, a solution polymerization method, a suspension polymerization method and an emulsion polymerization method.

Here, monomer concentration at the polymerization generally ranges from 30 wt % to 70 wt %, and preferably ranges from 40 wt % to 60 wt %, approximately.

Furthermore, a thickening agent, a wet agent, a leveling agent, an antifoaming agent or the like may be added to the resin for forming the pressure-sensitive adhesive layer, as appropriate. When a cross-linking acrylic copolymer having a functional group is used as the acrylic resin, it is preferable to add a hardening agent having a reactive functional group that reacts with the above-mentioned functional group. When an acrylic copolymer that is not cross-linking is used as the acrylic resin, a hardening agent can be added as appropriate. In the case where a hardening agent is added, the hardening agent is preferably selected so that the pressure-sensitive adhesive layer may have a residual rate and a fall time within the range of the present invention, after being formed in the groove of the retroreflective sheet. For example, in the retroreflective sheet of the present invention, the pressure-sensitive adhesive layer is preferably formed of a pressure-sensitive adhesive composition including a cross-linking acrylic copolymer and a hardening agent.

In the case where the hardening agent is added to the cross-linking acrylic copolymer having a functional group, a content of the hardening agent is determined depending on kinds of a functional group and a substituent in the acrylic resin, and combination with the hardening agent, so that a pressure-sensitive adhesive layer is formed. The content of the hardening agent and the cross-linking acrylic copolymer is preferably selected so that the content thereof may allow the residual rate and a fall time of the pressure-sensitive adhesive layer to be in the range specified in the present invention after the pressure-sensitive adhesive layer is further subjected to aging treatment under an atmosphere of 23±2° C. and a relative humidity of 65±5% for 7 days.

In the retroreflective sheet of the present invention, the pressure-sensitive adhesive layer may be formed by applying a solution of the resin on a heat-resistant release material and subsequently drying by heat at 70° C. for 1 minute and at 100° C. for 2 minutes.

Examples of the hardening agent include an epoxy hardening agent, an isocyanate hardening agent, an aminoplast hardening agent, an ionic hardening agent and the like. The epoxy hardening agent may be sorbitolpolyglycidylether, polyglycerolpolyglycidylether, pentaerythritolpolyglycidylether, diglycerolpolyglycidylether, triglycidyl-tris(2-hydroxyethylyisocyanurate, glycerolpolyglycidylether, trimethylolpropanepolyglycidylether, resorcindiglycidylether, neopentylglycoldiglycidylether, 1,6-hexandioldiglycidylether, bisphenol-S-diglycidylether, ethyleneglycoldiglycidylether, polyethyleneglycoldiglycidylether, propyleneglycoldiglycidylether, diglycidylester adipate, diglycidylether o-phthalate and the like. The isocyanate hardening agent may be toluylenediisocyanate, a 2,4-toluylenediisocyanate dimer, naphthylene-1,5-diisocyanate, o-toluylenediisocyanate, diphenylmethanediisocyanate, triphenylmethanetriisocyanate, tris(p-isocyanatephenyl)thiophosphate, polymethylene-polyphenylisocyanate, hexamethylenediisocyanate, trimethylhexamethylenediisocyanate, isophoronediisocyanate, xylylenediisocyanate, a polyisocyanate prepolymer and the like. The aminoplast hardening agent may be a condensate or the like, which is obtained by reacting various amono-group-containing compounds such as melamine, urea, acetoguanamine, benzoguanamine, steroguanamine and spiroguanamine, with various aldehyde compounds such as formaldehyde, paraformaldehyde, acetaldehyde and glyoxal, by an usual method. The ionic hardening agent may be zinc acetate, magnesium acetate, or calcium acetate, which includes $Mg^{2+}$, $Ca^{2+}$, $Zn^{2+}$, $Al^{3+}$ or the like.

The residual rate and the fall time of the pressure-sensitive adhesive layer of the retroreflective sheet of the present invention can be adjusted by forming the pressure-sensitive adhesive layer by determining, for example, appropriate kinds and contents of a resin and a hardening agent as materials of the pressure-sensitive adhesive layer.

The retroreflective sheet laminate of the present invention includes the retroreflective sheet of the present invention and a resin release film, in which the resin release film is laminated on the pressure-sensitive adhesive layer.

In the retroreflective sheet laminate of the present invention, the resin release film is preferably a flexible resin film with Young's modulus ranging between 50 MPa and 2000 MPa inclusive. More preferably, the Young's modulus thereof ranges between 100 MPa and 1500 MPa inclusive, and further preferably, ranges between 150 MPa and 1000 MPa inclusive.

In the retroreflective sheet laminate of the present invention, the flexible resin film is preferably an unstretched polypropylene (PP) film or a low-density polyethylene (LDPE) film.

In the retroreflective sheet laminate of the present invention, a thickness of the unstretched polypropylene film preferably ranges between 20 μm and 150 μm inclusive. More preferably, the thickness ranges between 30 μm and 130 μm inclusive, and further preferably, ranges between 40 μm and 100 μm inclusive.

In the retroreflective sheet laminate of the present invention, a thickness of the low-density polyethylene film preferably ranges between 20 μm and 200 μm inclusive. More preferably, the thickness ranges between 40 μm and 150 μm inclusive, and further more preferably, ranges between 60 μm and 100 μm inclusive.

The method for manufacturing a laminate of a heat-resistant release material and the retroreflective sheet of the present invention includes, as mentioned above, steps of: preparing an original sheet of a retroreflective sheet including plural retroreflective elements, a resin support sheet, and a transparent cover film disposed on a surface side of the resin support sheet, in which the retroreflective element is held in at least one of the resin support sheet and the cover film, the resin support sheet and the cover film are connected to each other by heat press emboss forming from a rear face of the resin support sheet so as to form a connection part, and a groove of the connection part is formed on the rear face side of the resin support sheet; forming a pressure-sensitive adhesive layer on the heat-resistant release material; and filling the groove of the resin support sheet with a part of the pressure-sensitive adhesive layer by disposing the heat-resistant release material with the pressure-sensitive adhesive layer formed thereon on the rear face side of the original sheet of the retroreflective sheet, and adhering them to each other by inter-roll line pressure ranging between 100 N/cm and 800 N/cm inclusive at a roll surface temperature ranging between 50° C. and 90° C. inclusive from a heat-resistant release material side.

It is preferable that the above-mentioned manufacturing method further includes a step of aging the pressure-sensitive adhesive layer at 23±2° C. and a relative humidity of 65±5% for 7 days.

In the manufacturing method, the heat-resistant release material is preferably a paper, a synthetic resin laminated paper, a polypropylene film or a polyester film. In this case, a thickness of the paper preferably ranges between 20 μm and 200 μm inclusive. More preferably, the thickness thereof ranges between 40 μm and 170 μm inclusive, and further preferably, ranges between 60 μm and 150 μm inclusive. A thickness of the synthetic resin laminated paper preferably ranges between 30 μm and 220 μm inclusive. More preferably, the thickness thereof ranges between 50 μm and 200 μm inclusive, and further preferably, ranges between 70 μm and 180 μm inclusive. In this case, a thickness of the polypropylene film preferably ranges between 15 μm and 250 μm inclusive. More preferably, the thickness thereof ranges between 30 μm and 230 μm inclusive, and further preferably, ranges between 50 μm and 200 μm inclusive. A thickness of the polyester film preferably ranges between 15 μm and 250 μm inclusive. More preferably, the thickness thereof ranges between 30 μm and 220 μm inclusive, and further preferably, ranges between 50 μm and 190 μm inclusive.

The retroreflective sheet laminate of the present invention as an example of a pattern of product to be shipped may be manufactured by, for example, peeling off the heat-resistant release material from a laminate of the retroreflective sheet of the present invention and the heat-resistant release material, which is manufactured by the above-described method, followed by adhering a resin release film to the pressure-sensitive adhesive layer of the retroreflective sheet. In this case, for example, after forming the pressure-sensitive adhesive layer, the heat-resistant release material may be peeled off, and the resin release film may be adhered there, and then aging treatment may be performed at 23±2° C. and a relative-humidity of 65±5% for 7 days. Alternatively, after forming the pressure-sensitive adhesive layer, the aging treatment may be performed for 7 days, and subsequently, the heat-resistant release material may be peeled off, and the resin release film may be adhered there. The aging treatment for 7 days may be performed separately before and after the adhesion of the resin release film. In particular, the aging treatment is preferably performed at 23±2° C. and a relative humidity of 65±5% for 7 days, after the adhesion of the resin release film.

An example of a method for manufacturing the retroreflective sheet of the present invention will be specifically described with reference to the drawings. FIGS. 1 to 7 show processes of an example of a method for manufacturing the retroreflective sheet of the present invention.

For a retroreflective element, a transparent bead having a reflective mirror on a hemisphere part thereof, a cube corner type retroreflective element and the like can be used. Here, a case of using the transparent bead having the reflective mirror at the hemisphere part will be illustrated. Hereinafter, a capsule lens type retroreflective sheet will be illustrated, in which the transparent bead is supported so that the hemisphere part covered with the reflective mirror may be embedded in the resin support sheet, although the retroreflective element is held in at least one of the resin support sheet and the cover film as mentioned above. In the case of the cube corner type retroreflective element, it is held in the cover film.

Primarily, a reflective mirror is formed at a hemisphere part of the transparent bead. As shown in FIG. 1, plural transparent glass beads 2 as the transparent beads are embedded in a surface of glass-beads-temporarily-fixing layer 7 made of polyethylene, which is laminated on a polyester film 8 as a first film. For embedding, a laminate of the glass-beads-temporarily-fixing layer 7 and the polyester film 8 is heated so as to soften polyethylene, thereby sinking the glass beads 2 into the glass-beads-temporarily-fixing layer 7. As mentioned above, the glass bead 2 is one example of the transparent bead. Examples of the transparent bead include a glass bead, a transparent resin bead and the like. Among them, a glass bead is preferable. A particle diameter of the transparent bead ranges, for example, from approximately 5 μm to 300 μm, preferably ranges from approximately 20 μm to 90 μm, and more preferably ranges from 40 μm to 80 μm. A refractive index of the transparent bead ranges, for example, approximately 1.8 to 2.1, preferably ranges approximately 1.9 to 1.95, and more preferably ranges from 1.92 to 1.93.

Next, on hemisphere surfaces of the glass beads 2, which are exposed from the surface of the glass-beads-temporarilyfixing layer 7, a metal reflective layer 3 is formed by an vapor deposition method. Since this vapor deposition is performed on the whole surface of the glass-beads-temporarily-fixing layer 7, the metal reflective layer 3 is formed not only on the surfaces of the glass beads 2, but also on the surface of the glass-beads-temporarily-fixing layer 7. Examples of a material of the metal reflective layer 3 include aluminium, gold, silver, copper, nickel, chromium, tin, an alloy including these metals, titanium oxide, titanium nitride and the like, which have excellent reflectivities. Among them, aluminium is particularly preferable.

Examples of the retroreflective sheet of the present invention include two types of retroreflective sheets having the following configurations:
(A) including a primer layer 5 provided on a rear face of the resin support sheet 4 (see FIG. 2); and
(B) not including a primer layer 5 on a rear face of the resin support sheet 4.

A pressure-sensitive adhesive layer is laminated on the rear face of the primer layer 5 in the case of (A), or on the rear face of the resin support sheet 4 in the case of (B). In order to transfer the glass beads 2 in the glass-beads-temporarily-fixing layer 7 to the resin support sheet 4, a high molecular-weight or low molecular-weight plasticizer or the like may be used for the resin support sheet 4. These plasticizers and the like are transferred to an interface between the pressure-sensitive adhesive layer and the resin support sheet 4, or to the pressure-sensitive adhesive layer over the course of time, thereby degrading a sticking property of the pressure-sensitive adhesive layer. This leads to deterioration of an interfacial sticking property between the pressure-sensitive adhesive layer and the resin support sheet 4, deterioration of a sticking property of the pressure-sensitive adhesive layer to the substrate, and the like. The primer layer 5 may be used for solving this problem, that is, for preventing the plasticizer and the like from transferring from the resin support sheet 4 to the pressure-sensitive adhesive layer.

A resin for forming the resin support sheet 4 may be a thermoplastic resin or a thermosetting resin. The thermosetting resin is preferably a combination of a resin having a functional group, for example, a self-cross-linking type resin having one or plural functional groups or a resin having at least one functional group, and a hardening agent having a functional group that can react with these functional groups. In order to improve a spreading property and an adherence of the glass beads, a silane coupling agent, for example, a resin with relatively low molecular weight having a polar group can be added to the thermosetting resin. In the resin for forming the resin support sheet 4, a total weight of the resin having a functional group and the hardening agent is more than 50% of weight parts of the resin for forming the resin support sheet 4, and preferably more than 70% thereof.

Examples of the resin having a functional group include an acrylic resin, a fluororesin, a vinyl copolymer such as a styrene copolymer, a polycondensation copolymer such as a polyester resin and a polyurethane resin. The functional group denotes a reactive functional group that can react with a component of the hardening agent, or a self-cross-linking functional group. Examples of the reactive functional group that reacts with the component of the hardening agent include a hydroxyl group, a carboxyl group, an epoxy group, an isocyanate group, an amino group, an acid amide group, an unsaturated double bond and the like. Examples of the self-cross-linking functional group include a hydrolyzable silyl group, a N-methylolacrylamide group, an alkyletherified N-methylolacrylamide group, an unsaturated double bond and the like.

When the reactive functional group is a group having a so-called active hydrogen atom, such as a hydroxyl group, a carboxyl group, an amino group and an acid amide group, the hardening agent may be an isocyanate hardening agent, an aminoplast hardening agent, a polyepoxy compound, an acid anhydride or the like. When the reactive functional group is an epoxy group or the like, the hardening agent may be polyamine, polybasic acid or the like. When the reactive functional group is an isocyanate group, the hardening agent may be various polyhydroxy compounds such as glycol and the like.

Moreover, when the reactive functional group is a so-called self-cross-linking functional group such as a hydrolyzable silyl group, a cross-linking accelerator may be used additionally. This cross-linking accelerator is a catalyst for hydrolyzation or condensation of this hydrolyzable silyl group. Examples of this cross-linking accelerator include: various acid compounds such as sulfuric acid, hydrochloric acid and phosphoric acid; an amine compounds such as monomethylamine and triethylamine; various organic tin compounds such as di-n-butyl tin dilaurate, di-n-butyl tin diacetate, di-n-butyl tin dioctoate, and the like.

Examples of the resin for forming the primer layer 5 include a resin having a functional group that is for forming the resin support sheet, and a resin and a hardening agent selected from the above-noted hardening agents having functional groups that react with those resins and the functional groups of those resins. The resin for the primer layer 5 preferably has an excellent interlayer adhesiveness with respect to the resin support sheet 4.

The primer layer 5 can be obtained by, for example, applying a solution of the resin for forming the primer layer on a polyester film 6 that is separately prepared as a second film, and drying by, for example, a hot-air drier. The second film is an example of a support in a preferable manufacturing method of the present invention. A thickness of the primer layer 5 after being dried ranges, for example, from 3 μm to 100 μm, and preferably ranges from 6 μm to 50 μm. The thickness of 3 μm or more is preferable because an effect of preventing the transfer of the plasticizer or the like can be enhanced. The thickness of 100 μm or less is also preferable because workability such as the adhesion of the retroreflective sheet can be improved.

Figure 2:
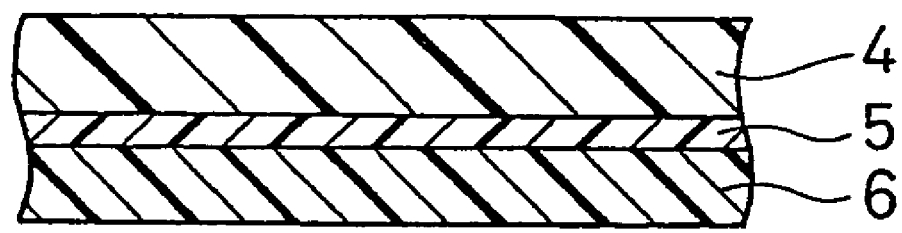
FIG. 2 is a cross-sectional view showing a process of forming a resin support sheet, according to an example of the manufacturing method of the present invention.

Next, the resin support sheet 4 is formed on the face of the primer layer 5 (FIG. 2). For a resin for forming the resin support sheet 4, any of the resin having a functional group and the resin having no functional group can be used, but the resin having a functional group is preferable.

The resin support sheet 4 can be obtained by, for example, applying the solution of the resin for forming the resin support sheet on the primer layer 5, and drying by, for example, a hot-air drier (see FIG. 2). A thickness of the resin support sheet 4 after being dried ranges, for example, from 10 μm to 300 μm, and preferably ranges from approximately 30 μm to 100 μm.

The retroreflective sheet of the type (B) having no primer layer 5 can be obtained by omitting the process of forming the primer layer from the method for manufacturing the retroreflective sheet.

Figure 3:
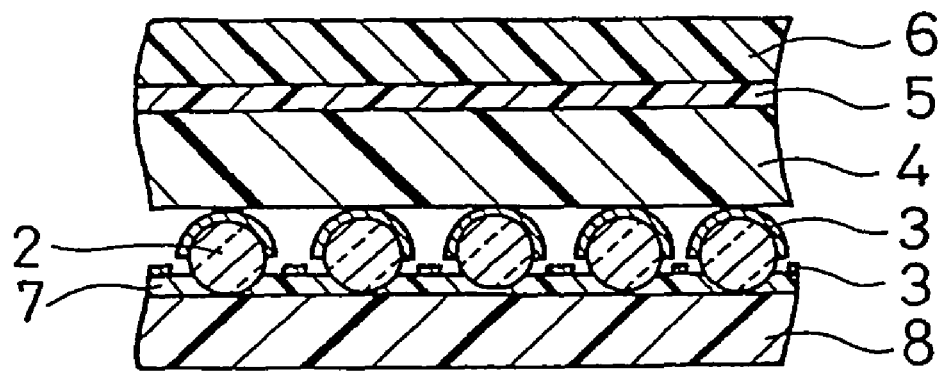
FIG. 3 is a cross-sectional view showing a process of transferring glass beads, according to an example of the manufacturing method of the present invention.

Next, as shown in FIG. 3, a laminate of the polyester film 6, the primer layer 5 and the resin support sheet 4 is disposed along a surface of the glass-beads-temporarily-fixing layer 7. Here, the resin support sheet 4 disposed to be in contact with surfaces of the glass beads 2 of the glass-beads-temporarily-fixing layer 7, on which the metal reflective layer 3 is deposited.

Figure 4:
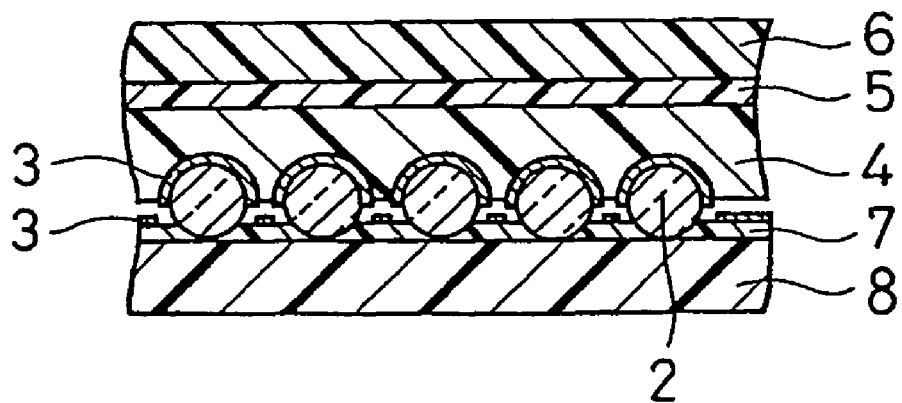
FIG. 4 is a cross-sectional view showing a process of embedding glass beads in a resin support sheet, according to an example of the manufacturing method of the present invention.

Then, as shown in FIG. 4, the laminate is pressed onto the surface of the glass-beads-temporarily-fixing layer 7. This is performed so that the hemispheres of the glass beads 2 with the deposited metal reflective layer 3 may be embedded in the resin support sheet 4. Here, a coupling agent and the like further may be added to the resin support sheet 4 so as to improve adherence of the resin support sheet 4 to the glass beads 2.

Figure 5:
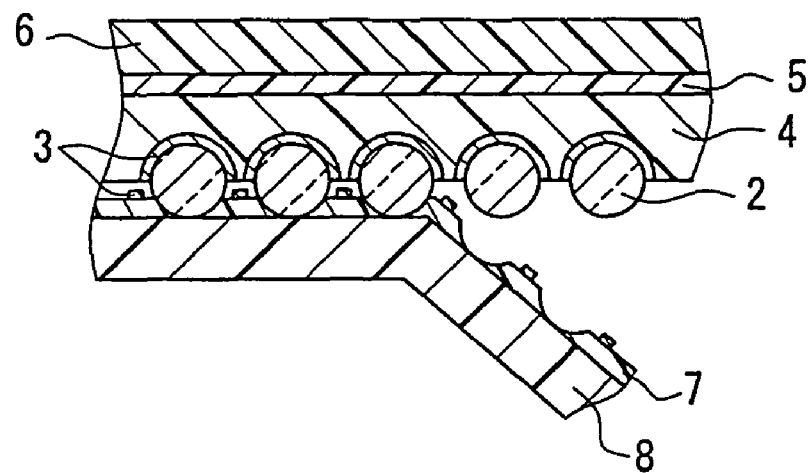
FIG. 5 is a cross-sectional view showing a process of exposing antireflection surfaces of glass beads, according to an example of the manufacturing method of the present invention.

Then, as shown in FIG. 5, the glass-beads-temporarily-fixing layer 7 is peeled off with the polyester film 8 from the surface of the resin support sheet 4. Here, as shown in FIG. 5, the glass beads 2 remain in the resin support sheet 4, thereby being supported by the resin support sheet 4 in a state where the hemispheres on which the metal reflective layer 3 is deposited are embedded. The metal reflective layer 3 that is provided to the part other than the hemispheres of the glass beads 2 exposed from the surface of the glass-beads-temporarily-fixing layer 7 remains on the surface of the glass-beads-temporarily-fixing layer 7.

Subsequently, in the case where the primer layer 5 and/or the resin support sheet 4 include a hardening agent that is curable at a room temperature (for example, an isocyanate hardening agent or the like), aging treatment is preferably performed at a temperature between 30° C. and 40° C. so as to cure the primer layer 5 and/or the resin support sheet 4. This step is for reducing variations in performance of a connection part that is formed during the process of heat press emboss forming, as well as for stabilizing a self-sustaining form thereafter. In addition, a heat treatment also may be performed at a temperature between 120° C. and 150° C. in order to improve a fixation property between the glass beads 2 and the resin support sheet 4.

Figure 6:
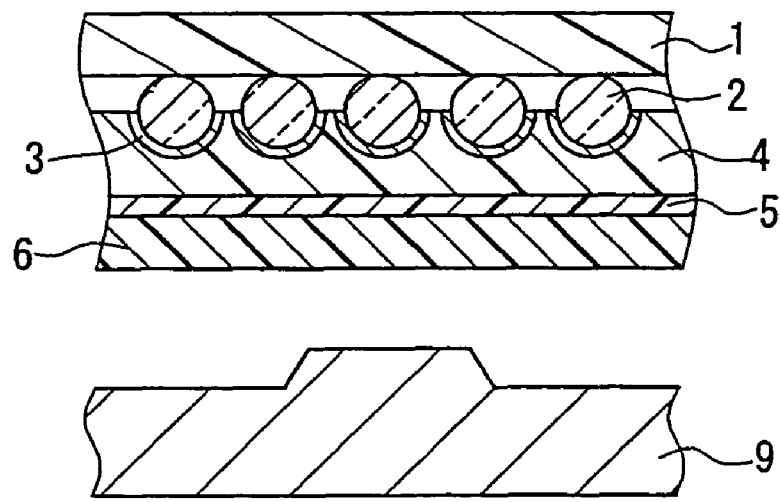
FIG. 6 is a cross-sectional view showing a process of heat press emboss forming from a rear face side of a resin support sheet, according to an example of the manufacturing method of the present invention.

Next, the surface of the resin support sheet 4 supporting the glass beads 2, being in the state as illustrated in FIG. 6, is covered with a transparent cover film 1. For this cover film 1, a film with good transparency such as an unstretched acrylic film, a polyester resin, an acrylic resin, an alkyd resin, an urethane resin, a vinyl chloride resin, a polycarbonate resin, a fluororesin, an acrylic silicon resin and the like can be used. Among them, the unstretched acrylic film is particularly preferable.

For the cover film 1, films manufactured by a method other than a casting method, that is, any of well known methods such as an extrusion method and a calender method, also may be used. These films are stretched inevitably by at least 10% to 20% in a flowing direction of the films during the manufacture, according to its manufacturing method, but a film with minimal stretch is preferable.

It is preferable to use a thermoplastic resin as the cover film 1, because a heat sealing between the resin support sheet 4 and the cover film 1 can be performed well.

In the case where a resin that is not so suitable for heat sealing, for example, some of thermosetting resins and fluororesins, a silicon resin or the like are used for the cover film 1, a laminate of a resin with high suitability for heat sealing and the above-mentioned resin may be used as the cover film 1.

When forming the cover film 1, an ultraviolet absorber and an antioxidant may be used in combination.

Figure 7:
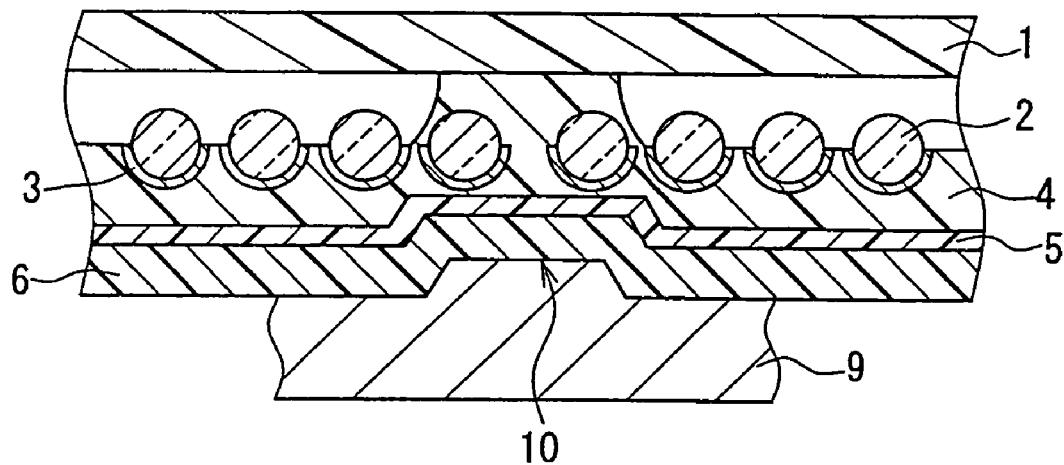
FIG. 7 is a cross-sectional view showing a process of heat press emboss forming, according to an example of the manufacturing method of the present invention.

Heat press processing is performed from a polyester film 6 side of the resin support sheet 4 on which the cover film 1 disposed, using an patterned embossing roll 9 (see FIG. 7). This heat pressing is suitably performed by passing through a heat roll. A surface temperature of the roll ranges, for example, from 150° C. to 240° C., and preferably ranges from 170° C. to 220° C. The surface temperature of 150° C. or higher is preferable, because the heat pressing can be performed, the resin support sheet 4 and the cover film 1 can be adhered, and the resin support sheet 4 can maintain its self-sustaining form over a long period. The surface temperature of 240° C. or lower is preferable, because the polyester film 6 as the second film is not melted, and the workability of the heat pressing can be improved.

After the process of heat press emboss forming, the polyester film 6 is peeled off so as to obtain the original sheet of the retroreflective sheet. Due to the process of heat pressing, an embossed groove 10 is formed on a rear face side of the resin support sheet 4. The groove has, for example, a width ranging from 200 μm to 800 μm and a depth ranging from 100 μm to 150 μm.

For the original sheet of the retroreflective sheet for composing the retroreflective sheet of the present invention, original sheets of retroreflective sheets manufactured by various known methods may be used as well as the original sheet of the capsule lens type retroreflective sheet.

Figure 10:
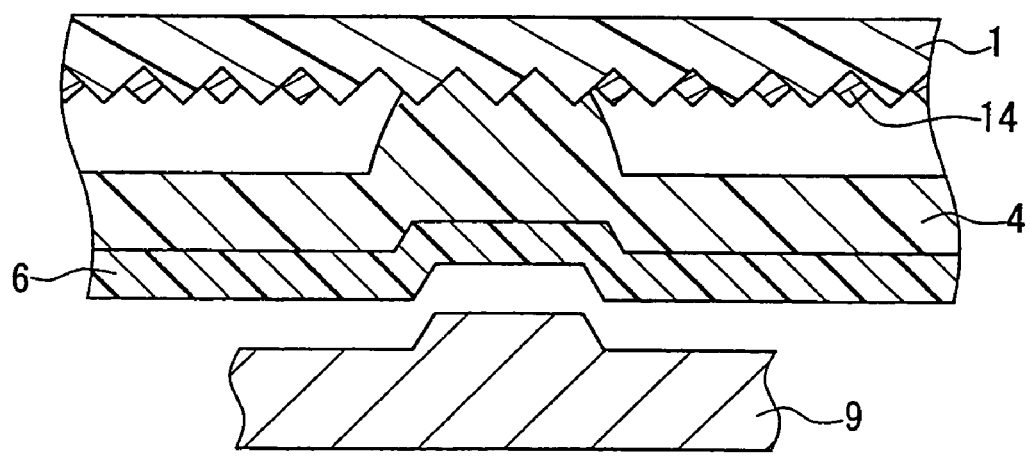
FIG. 10 is a cross-sectional view showing a capsule cube corner type retroreflective sheet after heat press emboss forming, according to an example of the manufacturing method of the present invention.

For example, as shown in FIG. 10, a capsule cube corner type retroreflective sheet which is formed by heat may be used as the original sheet of the retroreflective sheet. Also, a capsule cube corner type retroreflective sheet including the cover film 1, a cube corner type retroreflective elements 14 disposed on the rear face side of the cover film 1, a resin support sheet 4, and a connection part that is connected by heat forming can be used.

Next, a pressure-sensitive adhesive layer is formed on a heat-resistant release material that is prepared separately. The pressure-sensitive adhesive is as described above. For the release material, a known or conventional hard release paper can be used. Examples thereof include: a base material obtained by providing a filling layer on an original paper such as a glassine paper, a clay coated paper, a kraft paper and a woodfree paper, with a thickness ranging from 30 μm to 100 μm; a polyethylene laminated paper with a thickness ranging from 50 μm to 200 μm (manufactured by laminating a synthetic resin such as polyethylene and polypropylene on a kraft paper, a woodfree paper or the like); and a film of polypropylene, polyethylene terephthalate or the like with a thickness ranging from 15 μm to 250 μm, on which a silicone resin, a fluororesin or the like of emulsion type, solvent type or solventless type is applied, and a release agent layer is subsequently formed by curing with heat, electron beams, ultraviolet or the like. Among the above-noted release agents, the silicone resin is particularly preferable. For a method for forming the release agent layer, a conventionally known method, for example, a comma coater, a bar coater, a gravure coater, a reverse roll coater or the like can be used as appropriate.

The pressure-sensitive adhesive layer 11 can be formed on the heat-resistant release material in the following manners. For example, a solution of the pressure-sensitive adhesive is applied on the face of the release agent layer of a release paper 12 as an example of the release material, and is dried as necessary, thereby obtaining the pressure-sensitive adhesive layer 11.

For an apparatus for applying a pressure-sensitive adhesive, for example, a reverse roll coater, a knife coater, a bar coater, a slot dye coater, an air knife coater, a reverse gravure coater, a vario gravure coater or the like can be used. An amount of the solution of the pressure-sensitive adhesive to be applied is adjusted so that a thickness of the pressure-sensitive adhesive layer after being dried can be in the range, for example, from 20 μm to 110 μm.

The solution of the pressure-sensitive adhesive may include the pressure-sensitive adhesive and the above-noted additives as necessary. For a solvent of the pressure-sensitive adhesive solution, commonly used organic solvents, for example, toluene, benzene, butyl acetate, ethyl acetate, methylisobutylketone, methylethylketone, various kinds of alcohol or the like can be used.

Figure 8:
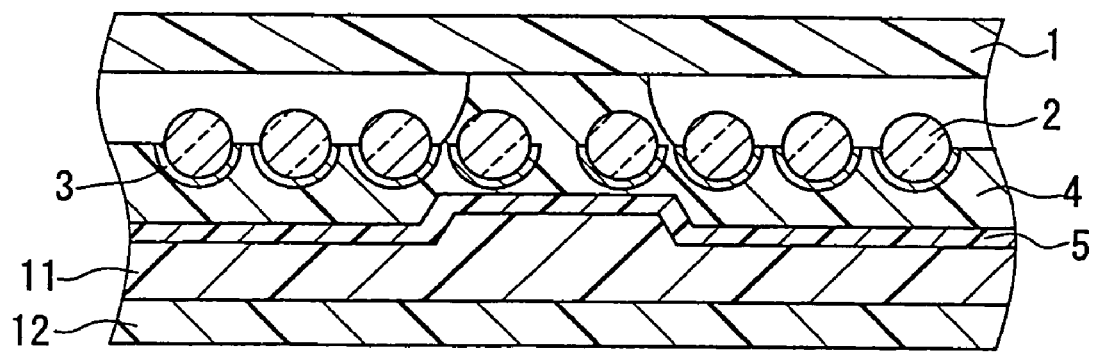
FIG. 8 is a cross-sectional view showing a process of covering a heat press emboss formed side with a heat-resistant release material having a pressure-sensitive adhesive layer formed thereon, according to an example of the manufacturing method of the present invention.

Next, the laminate of the release material and the pressure-sensitive adhesive layer 11 is adhered to the original sheet of the retroreflective film. The method for the adhesion can be a commonly known method, for example, adhering by an adhesion roll that the pressure-sensitive adhesive layer 11 of this laminate faces the primer layer 5 (or the resin support sheet 4 if omitting the primer layer 5) of the original sheet of the retroreflective sheet (see FIG. 8).

During this, when a roll temperature of an adhesion roll on the release paper side is set to be in a range, for example, from 50° C. to 90° C., preferable range from 55° C. to 85° C., or more preferable range from 60° C. to 80° C., the embossed groove 10 can be sufficiently filled with a part of the pressure-sensitive adhesive layer. The roll temperature of 90° C. or lower is preferable because a damage such as shrinkage occurring to the cover film 1 of the original sheet of the retroreflective sheet can be suppressed. Moreover, the roll temperature of 50° C. or higher is also preferable because heat can be applied effectively. Here, an adhesion pressure ranges, for example, from 100 N/cm to 800 N/cm, preferably ranges from 150 N/cm to 750 N/cm, more preferably ranges from 200 N/cm to 700 N/cm. The adhesion pressure of 100 N/cm or higher allows the grooves to be filled with the pressure-sensitive adhesive sufficiently, and the adhesion pressure of 800 N/cm or lower can prevent a damage such as a press pressure applied to the original sheet of the retroreflective sheet, thus being preferable.

Figure 9:
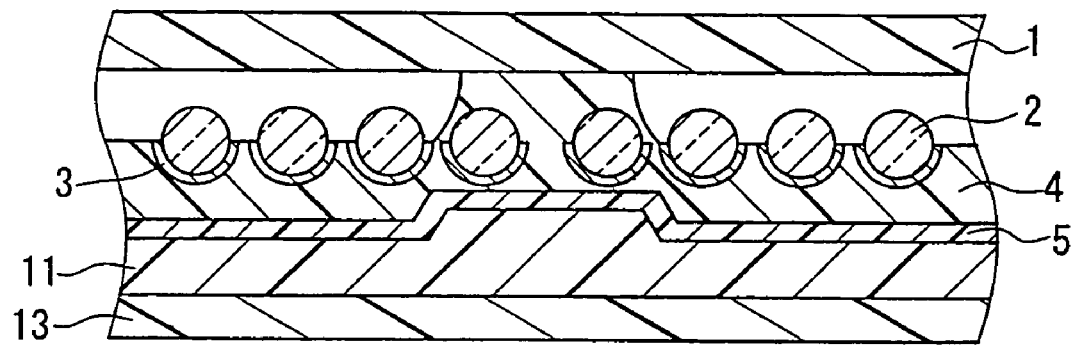
FIG. 9 is a cross-sectional view showing a process of adhering a resin release film instead of a heat-resistant release material, according to an example of the manufacturing method of the present invention.

Subsequently, the release paper 12 is peeled off. Heat-resistant release materials such as the release paper 12 generally have poor flexibility. In such a case, it is preferable to peel off the heat-resistant release material and then adhere a resin release film 13 to the pressure-sensitive adhesive layer so as to obtain the retroreflective sheet laminate of the present invention (see FIG. 9). Since the resin release film has excellent flexibility, even when the retroreflective sheet laminate is wound longitudinally and then rewound, the retroreflective sheet laminate will hardly be curled. This is preferable because, when the retroreflective sheet laminate is subjected to a process such as printing, a phenomenon of partially swelling and peeling like a tunnel between the retroreflective sheet and the resin release film can be suppressed. The resin release film with excellent flexibility is as described above.

Alternatively, the pressure-sensitive adhesive layer 11 may be formed directly on the primer layer 5 of the original sheet of the retroreflective sheet, and the resin release film 13 may be disposed on the pressure-sensitive adhesive layer 11. For example, the solution of the pressure-sensitive adhesive or a pressure-sensitive adhesive that is not diluted with a solvent is applied on the primer layer 5 (or the resin support sheet 4 if omitting the primer layer 5) of the original sheet of the retroreflective sheet, and is dried as necessary, thereby obtaining the pressure-sensitive adhesive layer 11. Since the pressure-sensitive adhesive used in this case has poor heat resistance, preferably it is curable by electron beams, ultraviolet or the like, without requiring heat dry. In this case, a coating layer of the solution of the pressure-sensitive adhesive or the pressure-sensitive adhesive that is not diluted with a solvent may be irradiated with electron beams or ultraviolet so that the pressure-sensitive adhesive may be cured, and the resin release film 13 may be subsequently adhered to the pressure-sensitive adhesive layer 11.

The present invention will be described below more specifically, with reference to examples and comparative examples, but the present invention is not limited to the below-described examples. In the following description, "part" represents "part by weight", and "%" represents "weight %".

First, examples of preparing a resin that is necessary for manufacturing the retroreflective sheet will be described.

Examples of preparing a resin having a functional group and a resin having no functional group 1. Preparation of a Solution (A-1) of an Acrylic Resin Having a Hydroxyl Group 700 parts of toluene and 300 parts of n-buthanol were introduced into a reactor provided with an agitator, a thermometer, a condenser and a nozzle for introducing nitrogen gas, and was warmed up to 80° C. under an atmosphere of nitrogen. Then, a mixture containing 500 parts of methyl methacrylate, 400 parts of ethyl methacrylate, 100 parts of 2-hydroxyethyl methacrylate, 8 parts of azobisisobutyronitrile and 5 parts of tert-buthyl peroxy octoate (TBPO) was dropped over 4 hours. This was sustained at this temperature for 10 hours, then the solution (A-1) [nonvolatile content=50%; weight-average molecular weight=32,000; hydroxyl value=43 mg KOH/g solid; equivalent weight of reactive functional groups calculated from the hydroxyl value=1,300 (solid)] of the acrylic resin having the hydroxyl group was obtained.

2. Preparation of a Solution (A:-1) of an Acrylic Resin Having No Functional Group A solution (A'-1) (nonvolatile content: 50%, and weight-average molecular weight: 81,000) of an acrylic resin having no functional group was obtained, in the same manner as the example of preparing the solution (A-1) of the acrylic resin having the hydroxyl group, except using "700 parts of methylmethacrylate and 300 parts of ethylacrylate" instead of "500 parts of methylmethacrylate, 400 parts of ethylmethacrylate and 100 parts of 2-hydroxyethylmethacrylate", using 5 parts of azobisisobutyronitrile instead of "8 parts" thereof, and using 2 parts of tert-buthyl peroxy octoate (TBPO) instead of "5 parts" thereof.

3. Example of Preparing a Solution (A-2) of an Acrylic Resin Having a Hydroxyl Group 1,000 parts of water, 200 parts of styrene, 200 parts of n-butylacrylate, 100 parts of 2-hydroxyethylmetacrylate, 20 parts of 1% solution of polyvinyl alcohol (average polymerization degree: 100) and 2 parts of azobisisobutyronitrile were introduced into the same apparatus as that in the example (A-1). The mixture thereof was agitated so as to keep the system in suspension, and subsequently the system was warmed up to 80° C. and reacted at the temperature for 4 hours.

Next, a suspended solution obtained after the reaction was washed with water, the water was drained, and then the suspended solution was dried, thereby obtaining a resin in a form of bead. 400 parts of this resin was dissolved into 1,600 parts of toluene, thereby obtaining a solution (A-2) [nonvolatile content=20%; weight-average molecular weight=250,000; hydroxyl value=86 mg KOH/g solid; equivalent weight of reactive functional groups calculated from the hydroxyl value=652 (solid)] of an acrylic resin having a hydroxyl group.

4. Example of Preparing a Solution (A-3) of a Fluororesin Having a Hydroxyl Group 1,000 parts of xylene, 10 parts of bis(1,2,2,6,6-pentamethylpiperidinyl)sebacate, tert-butylperoxypivalate, 200 parts of cyclohexylvinylether, 230 parts of ethylvinylether and 70 parts of 4-hydroxybutylvinylether were introduced into a stainless autoclave with interior capacity of 5,000 ml. Then nitrogen gas was injected into the autoclave so as to replace the air therein.

Furthermore, 500 parts of hexafluoropropylene extracted by liquidation was introduced into the autoclave. After sealing the autoclave, a temperature therein was maintained at 60° C., and a reaction was carried out for 15 hours, thereby obtaining a solution (A-3) [nonvolatile content=50%; weight-average molecular weight=42,500; hydroxyl value=67 mg KOH/g solid; equivalent weight of reactive functional groups calculated from the hydroxyl value=840 (solid)] of a fluororesin 5. Example of Preparing a Solution (A-4) of a Polyester Resin Having a Hydroxyl Group 130 parts of ethylene glycol, 114 parts of neopentylglycol, 100 parts of 1,6-hexanediol, 48 parts of trimethylolpropane, 720 parts of isophthalic acid and 0.5 parts of dibutyl tin oxide were introduced into a reactor that is provided with an agitator, a thermometer, a rectifier and a nozzle for introducing nitrogen gas. A temperature of a system in the reactor was increased to 220° C., maintained for 3 hours, and further increased to 240° C., and thereafter, a dehydration reaction was performed while the temperature was maintained for 6 hours. Subsequently, the temperature of the system was decreased to 130° C., and then 1,000 parts of hexylene was added into the reactor, thereby obtaining a polyester resin solution (A-4) [nonvolatile content=50%; weight-average molecular weight=47,000; hydroxyl value=10 mg KOH/g solid; equivalent weight of reactive functional groups calculated from the hydroxyl value=5,650 (solid)].

Following measuring methods are adopted in the examples of the present invention.

(1) Yamamoto's Cohesion Test

Figure 12:
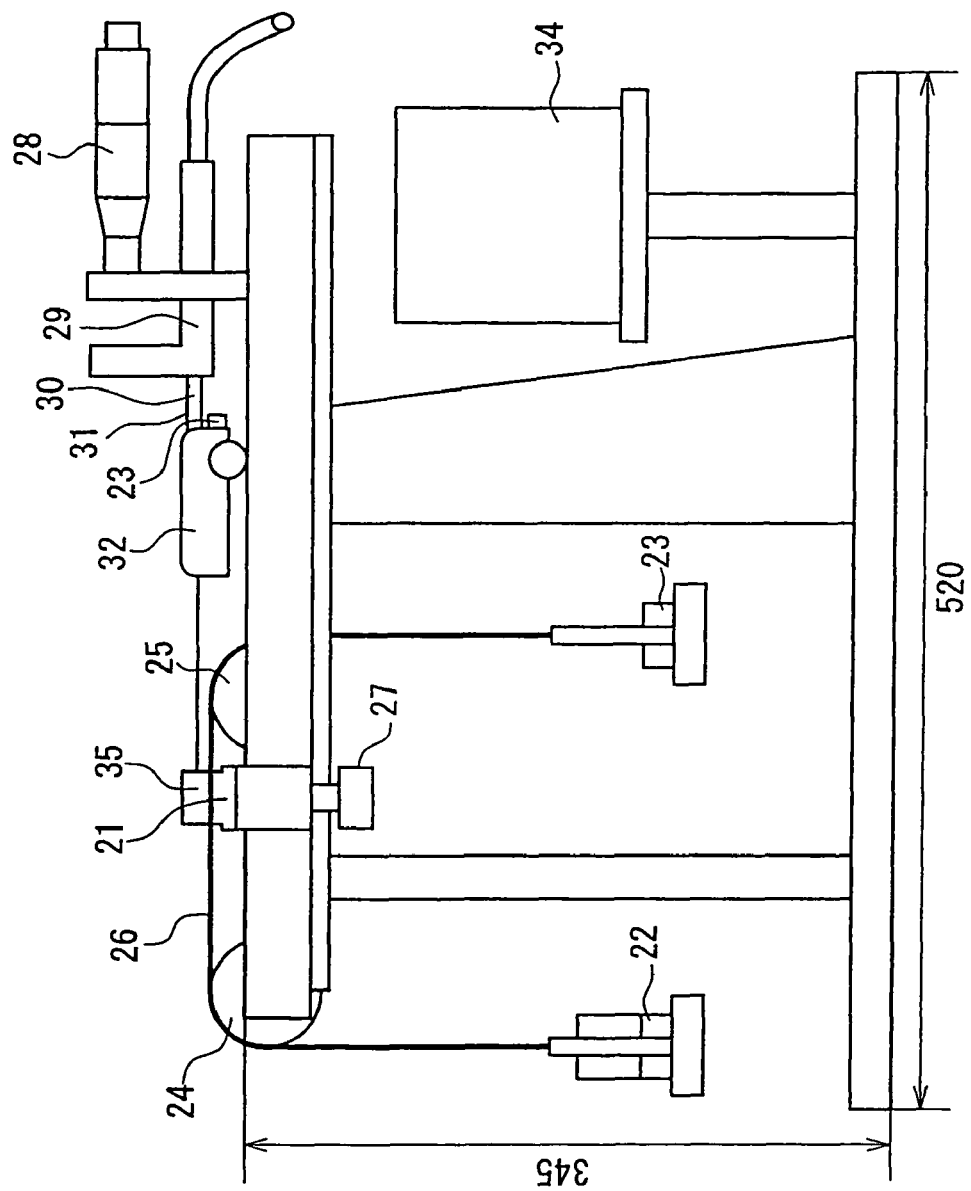
FIG. 12 is a illustrative view describing a measurement method using a Yamamoto's cohesion tester which is employed in the examples of the present invention.
Figure 13:
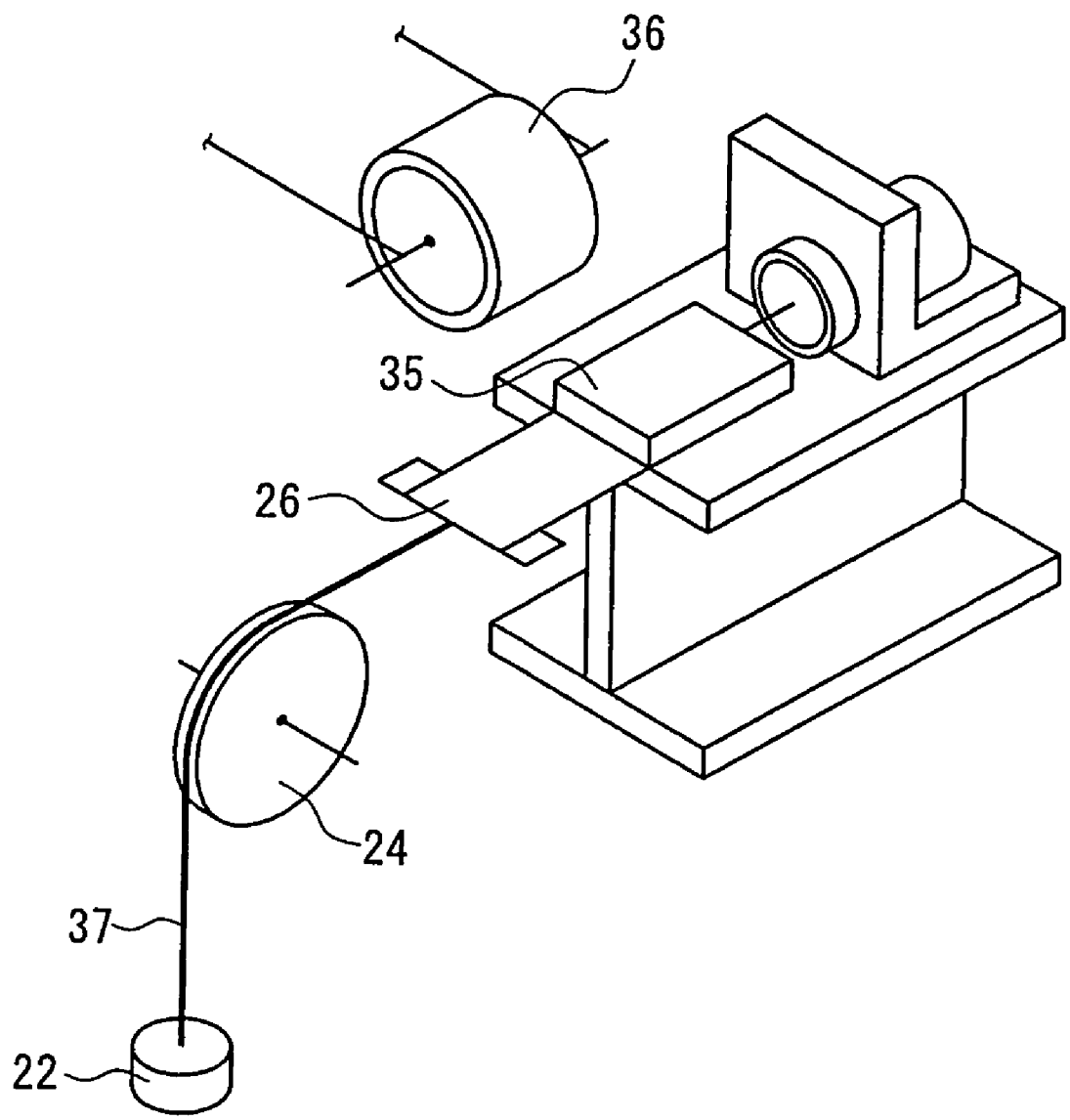
FIG. 13 is a schematic perspective reference view of a Yamamoto's cohesion tester employed in the examples of the present invention.

A Yamamoto's cohesion tester shown in FIG. 12 was used. This apparatus has a width of 520 mm, a height of 345 mm and a depth of 140 mm, in which a retroreflective sheet 26 was disposed with a pressure-sensitive adhesive layer facing down and being adhered to an adherend 21, and loads 22 and 23 were respectively connected to both ends of the retroreflective sheet 26 via strings that were hang over a load pulley 24 and a side pulley 25, respectively. A jig 32 with a core 30 of an electric micrometer 31 attached thereto was provided on the adherend 21 and the retroreflective sheet 26. Reference number 27 represents a clamping screw, 28 represents a micrometer, 29 represents a coil, 34 represents a display, and 35 represents a core holding block. FIG. 13 is a schematic perspective view showing a connection between the retroreflective sheet 26 and the strings in the tester shown in FIG. 12. Reference number 36 represents an pressing roller, and 37 represents a string.

Using the Yamamoto's cohesion tester, a specimen obtained by cutting the retroreflective sheet 26 with a width of 10 mm (a size of 10 mm×5 mm) was adhered to a mirror-surfaced flat plate of a SUS304 steel plate specified by JISG4305 with a width of 5 mm. Here, the adhesion was carried out by reciprocating the automatic roller 36 three times at a pressing speed of 5 mm/sec, which was specified by 10.2.4 in JISZ0237 and 2 kg in weight. Immediately after the pressing, loads of 17 g (the loads 22 and 23) were imposed to the both ends of the specimen via the strings. Subsequently, a measurement load of 200 g was further imposed to the load 22, and after 5 minutes, displacement (initial displacement) was measured. After 5 minutes from the imposition of the measurement load, the load of 200 g was removed. Displacement remaining after 10 minutes from the removal (residual displacement) was measured so as to obtain a residual rate. Here, the residual rate (%) was defined as (the residual displacement/the initial displacement)×100. The measurement condition was at 23±2° C. and at 65±5% in relative humidity.

(2) Share Holding Power Test

A holding power test was performed in accordance with the holding power test of JISZ0237. More specifically, the test was performed as follows using a SUS304 stainless steel plate as an adherend. Under atmosphere of 23±2° C. in temperature and 65±5% in relative humidity, a rubber roller of 2 kg in weight was reciprocated three times so as to press the retroreflective sheet onto the stainless steel plate. An area to be adhered was 25 mm×25 mm. After being left for 25 minutes, the stainless steel with the retroreflective sheet adhered thereto was kept being hung vertically for 1 hour in a holding power testing machine that was set to be at 40° C. After the elapse of 1 hour, a load of 9.8 N was imposed to (hung from) the retroreflective sheet, which was 1.568 N/cm². Thereafter, time interval (fall time) from a time of imposing the load to a time of fall of the retroreflective sheet from the stainless steel plate was measured. When the fall time is 24 hours or longer, the displacement was measured at the time when 24 hours passed.

EXAMPLE 1

In a surface of a 25 μm-thick glass-beads-temporarily-fixing layer made of polyethylene which was laminated on a polyester film (a first film), plural glass beads (retroreflective elements, particle diameter: 45-80 μm, and refractive index: 1.92-1.93) were embedded, so that the glass beads may be embedded into the surface of the glass-beads-temporarily-fixing layer by approximately 25% to 35% of a particle diameter thereof. The glass-beads-temporarily-fixing layer and the polyester film were softened by heat so as to embed the glass beads. Thereafter, aluminum was evaporated onto a surface of hemisphere parts of the glass beads exposed from the surface of the glass-beads-temporarily-fixing layer, thereby forming a reflective mirror.

Next, a solution containing: 83 parts by weight of an acrylic copolymer solution (solid: 50%) with a solvent of toluene and butyl acetate; and 17 parts by weight of methyl-etherified methylol melamine (solid: 60%) was applied onto a polyethylene terephthalate (polyester) film (thickness: 50 μm) as a second film that was prepared separately, and subsequently was dried using a hot-air drier, thereby forming a primer layer with a thickness of approximately 20 μm. The acrylic copolymer was consist of methyl methacrylate (PA), ethyl acrylate (EA), butyl acrylate (BA) and 2-hydroxyethyl-methacrylate (2-HEMA). Thereafter, a blended solution that mainly contains the solution (A-1) of the acrylic resin having the hydroxyl group was applied on this primer layer, and was dried using a hot-air drier, thereby forming a resin support sheet with a thickness of approximately 60 μm.

Content of the blended solution will be described as follows.

(1) 100 parts of the solution (A-1) of the acrylic resin having a hydroxyl group (solid: 50%)
(2) 11 parts of methyletherified methylol melamine (solid: 60%)
(3) 25 parts of rutile type titanium dioxide
(4) 13 parts of an acrylic resin for dispersing a pigment (solid: 50%)
(5) 1 part of a silane coupling agent.

Subsequently, a laminate of the polyester film (the second film), the primer layer and the resin support sheet was disposed on a metal deposition face side of the glass-beads-temporarily-fixing layer, so that the resin support sheet may be in contact with the surface of the glass beads in the glassbeads-temporarily-fixing layer. Thereafter, the laminate was pressed onto the surface of the glass-beads-temporarily-fixing layer. This pressing was performed so that the reflective mirror of the glass beads may be embedded into the resin support sheet. For the pressing, the laminate on which the resin support sheet was disposed was rolled by a heat roll with a surface temperature of 170° C.

Next, the glass-beads-temporarily-fixing layer was peeled off with the polyester film (the first film) from the surface of the resin support film, thereby obtaining a laminate. Subsequently, the thus obtained laminate was subjected to a heat treatment at 140° C. in order to improve an adhesiveness between the glass beads and the resin support sheet. The resin support sheet in which the hemispheres of the glass beads were embedded was covered with an uniaxially stretched (with a stretching ratio of 1.3, but substantially unstretched) transparent acrylic film (a cover film, manufactured by Kaneka Corporation) on the glass beads side, thereby obtaining a laminate. Thereafter, the thus obtained laminate was embossed by heat, being rolled from the polyester film (the second film) side, using an patterned embossing roll, with a roll surface temperature of 210° C. After this hot press emboss forming, the polyester film (the second film) was peeled off, so that an original sheet of a retroreflective sheet was obtained.

A solution of a pressure-sensitive adhesive was prepared by blending and stirring: 100 parts by weight of an acrylic resin (trade name: AROSET8964, manufactured by Nippon Shokubai Co., Ltd.), which contained a solid of 47 wt % and a high softening point tackifier and had an amide group, as a resin for a pressure-sensitive adhesive; and 0.2 parts by weight of a modified polyisocyanate resin (trade name: CORONATE L-55E, manufactured by Nippon Polyurethane Industry Co., Ltd.) as a hardening agent. The solution of the pressure-sensitive adhesive was applied onto a hard release paper (trade name: EKR-780, manufactured by Lintec Corporation), and was dried by heat at 70° C. for 1 minute and at 100° C. for 2 minutes, thereby forming a pressure-sensitive adhesive layer with a thickness of approximately 80 µm. Thereafter, a face of the primer layer of the original sheet of the retroreflective sheet and a face of the pressure-sensitive adhesive layer of the laminate composed of the release paper and the pressure-sensitive adhesive layer were adhered to each other, being rolled at an adhesion pressure of 450 N/cm and at a roll surface temperature of 70° C. A groove formed on the primer layer by the hot press emboss forming was filled with a part of the pressure-sensitive adhesive layer. Subsequently, the release paper was peeled off, and a flexible polypropylene (PP) release film (trade name: FILMBINA PP-S-80, manufactured by Fujimori Kogyo Co., Ltd., thickness: 80 µm, Young's modulus: 800 MPa) was adhered there, thus obtaining a retroreflective sheet laminate. The obtained retroreflective sheet laminate was subjected to aging under a condition of 23±2° C. and 65±5% of relative humidity for 7 days.

EXAMPLE 2

An original sheet of a retroreflective sheet was manufactured in the same manner as Example 1, except that the content of the blended solution for the resin support sheet was as follows, and the heat treatment to be performed after embedding the glass beads into the resin support sheet was omitted.
(1) 100 parts of the solution (A-2) of the acrylic resin having a hydroxyl group (solid: 20%)
(2) 6.0 parts of methyletherified methylol melamine (solid: 60%)
(3) 10 parts of rutile type titanium dioxide
(4) 5 parts of an acrylic resin for dispersing a pigment (solid: 50%)
(5) 2 parts of polyester plasticizer Next, a pressure-sensitive adhesive layer was formed in the same manner as Example 1, except using 100 parts by weight of an acrylic ester copolymer resin with a solid of 58 wt % (trade name: SK DYNE 1576, manufactured by Soken Chemicals & Engineering Co., Ltd.) and 5.1 parts by weight of an epoxy hardening agent (trade name: E-05C, manufactured by Soken Chemicals & Engineering Co., Ltd.) as a resin for the pressure-sensitive adhesive, so that a retroreflective sheet laminate was obtained. Thereafter, aging treatment was performed under the same condition as Example 1.

EXAMPLE 3

An original sheet of a retroreflective sheet was obtained in the same manner as Example 1, except that the formation of the primer layer was omitted, the content of the blended solution for the resin support sheet was changed as follows, the thickness of the resin support sheet was changed from 60 µm to 80 µm, and aging treatment was additionally performed at 30° C. for 1 month, after the glass beads were embedded into the resin support sheet and subjected to the heat treatment at 140° C.
(1) 100 parts of a polyester resin (A-4) (solid: 50%)
(2) 2.5 parts of HMDI-based isocyanurate (solid: 75%, NCO: 15%)
(3) 25 parts of rutile type titanium dioxide
(4) 12 parts of an acrylic resin for dispersing a pigment (solid: 50%)

Next, a pressure-sensitive adhesive layer was formed in the same manner as Example 1, except using 0.25 parts of CORONATE L-55E (trade name) manufactured by Nippon Polyurethane Industry Co., Ltd. as a hardening agent, so that a retroreflective sheet laminate was obtained. Thereafter, aging treatment was performed under the same condition as Example 1.

EXAMPLE 4

(Example of Using an Uncured Resin Sheet as the Resin Support Sheet)

An original sheet of a retroreflective sheet was obtained in the same manner as Example 1, except that the formation of the primer layer was omitted, the content of the blended solution for the resin support sheet was as follows, the thickness of the resin support sheet was changed from 60 µm to 80 µm.
(1) 100 parts of the solution (A:-1) of the acrylic resin (solid: 50%)
(2) 25 parts of rutile type titanium dioxide
(3) 13 parts of an acrylic resin for dispersing a pigment (solid: 50%)
(4) 5 parts of polyester plasticizer Next, a pressure-sensitive adhesive layer was formed in the same manner as Example 2, except using 5.5 parts of E-05C (trade name) manufactured by Soken Chemicals & Engineering Co., Ltd., as a hardening agent, so that a retroreflective sheet laminate was obtained. Thereafter, aging treatment was performed under the same condition as Example 1.

COMPARATIVE EXAMPLE 1

An original sheet of a retroreflective sheet was obtained in the same manner as Example 1, and then a pressure-sensitive adhesive layer was manufactured in a method described below. A solution of a pressure-sensitive adhesive was prepared by blending and stirring: 100 parts by weight of an acrylic alkyl ester copolymer resin (trade name: AROSET HI-81D, manufactured by Nippon Shokubai Co., Ltd), which contained 39 wt % of a solid and had an interpenetrating polymer network structure, as a resin for a pressure-sensitive adhesive; and 1.2 parts by weight of a hardening agent (trade name: CORONATE L-55E, manufactured by Nippon Polyurethane Industry Co., Ltd.). The solution of the pressure-sensitive adhesive was applied onto a hard release paper, and was dried, thereby forming a pressure-sensitive adhesive layer with a thickness of approximately 80 μm. Thereafter, a face of the primer layer of the original sheet of the retroreflective sheet and a face of the pressure-sensitive adhesive layer of the laminate composed of the release paper and the pressure-sensitive adhesive layer were adhered to each other, being rolled at an adhesion pressure of 450 N/cm and at a roll surface temperature of 70° C. A groove formed on the primer layer by the hot press emboss forming was filled with a part of the pressure-sensitive adhesive layer. Subsequently, the release paper was peeled off, and a flexible polypropylene (PP) release film (trade name: FILMBINA PP-S-80, manufactured by Fujimori Kogyo Co., Ltd., thickness: 80 μm, Young's modulus: 800 MPa) was adhered there, thus obtaining a retroreflective sheet laminate. Thereafter, aging treatment was performed under the same condition as Example 1.

COMPARATIVE EXAMPLE 2

An original sheet of a retroreflective sheet was obtained in the same manner as Example 1. Subsequently, a solution of a pressure-sensitive adhesive was prepared by blending and stirring: 100 parts by weight of an acrylic resin (trade name: AROSET HI-91D-3, manufactured by Nippon Shokubai Co., Ltd.), which contained a solid of 40 wt % and had a carboxylic acid as a functional group and chlorinated PP and PE that were grafted, as a resin for a pressure-sensitive adhesive; and 0.3 parts by weight of a hardening agent (trade name: CORONATE L-55E, manufactured by Nippon Polyurethane Industry Co., Ltd.). The retroreflective sheet laminate was obtained in the same manner as comparative Example 1 except that the solution of the pressure-sensitive adhesive was applied onto a hard release paper, and was dried by heat so as to form a pressure-sensitive adhesive layer with a thickness of approximately 40 μm. Thereafter, aging treatment was performed under the same condition as Example 1.

COMPARATIVE EXAMPLE 3

An original sheet of a retroreflective sheet is obtained in the same manner as Example 1. Subsequently, a retroreflective sheet laminate was obtained in the same manner as Comparative example 2, except using 100 parts by weight of an acryl-vinyl acetate copolymer resin (trade name: SAIVINOR AT-208, manufactured by Saiden Chemical Industry Co., Ltd.) with a solid of 43 wt % as a resin for a pressure-sensitive adhesive, and 1 part of a solution containing 2.2% of N,N,N',N'-tetraglycidyl-m-xylenediamine (toluene: 91.9%, IPA: 5.9%) (trade name: A-9, manufactured by Saiden Chemical Industry Co., Ltd.) as a hardening agent. Thereafter, aging treatment was performed under the same condition as Example 1.

Physical properties of the obtained retroreflective sheet laminate will be shown in Table 1 and 2. A "thickness of the pressure-sensitive adhesive layer" in Table 1 means "a thickness of the pressure-sensitive adhesive layer at a part where a groove is not formed on a rear face of the resin support sheet".

TABLE 1

|  | Thickness of the pressure-sensitive adhesive layer (μm) | Holding power | Residual rate (%) | Filling state of the pressure-sensitive adhesive layer |
|---|---|---|---|---|
| Example 1 | 80 | 2.0 mm/70 hrs | 26.7 | C |
| Example 2 | 80 | 2.2 mm/55 hrs | 29.4 | C |
| Example 3 | 80 | 1.9 mm/115 hrs | 34.6 | C |
| Example 4 | 80 | 2.3 mm/98 hrs | 36.2 | C |
| Comparative example 1 | 80 | 0.1 mm/>168 hrs | 9.2 | D |
| Comparative example 2 | 40 | —/2 hrs | 65.8 | D |
| Comparative example 3 | 40 | 0.4 mm/>168 hrs | 27.5 | E |

TABLE 2

| | Appearance | | | | | |
|---|---|---|---|---|---|---|
| | Method-1 | | Method-2 | | Method-3 | |
| | Immediately after the manufacture | After leaving in atmosphere at 60° C. for 24 hours | Immediately after the manufacture | After leaving in atmosphere at 60° C. for 24 hours | Immediately after the manufacture | After leaving in atmosphere at 60° C. for 24 hours |
| Example 1 | C | C | C | C | C | C |
| Example 2 | C | C | C | C | C | C |
| Example 3 | C | C | C | C | C | C |
| Example 4 | C | C | C | C | C | C |
| Comparative example 1 | C | D | C | D | C | D |
| Comparative example 2 | C | D | C | D | C | D |
| Comparative example 3 | C | D | C | D | C | D |

(Remarks)

(1) Holding power: (length of displacement after 24 hours)/(fall time)

(2) Filling state of the pressure-sensitive adhesive layer: the flexible polypropylene (PP) release film of the retroreflective sheet laminate was peeled off, and then a state of filling the pressure-sensitive adhesive layer into the grooves that were formed on the primer layer or the resin support sheet by the hot press emboss forming was visually observed.

Standard of Evaluation

C: The filling rate of the pressure-sensitive adhesive layer was in a range from 70 to 100%.

D: The filling rate of the pressure-sensitive adhesive layer was 50% or more, and lower than 70%.

E: The filling rate of the pressure-sensitive adhesive layer was lower than 50%.

(3) Standard of Appearance Evaluation

C: Abnormality such as wrinkles, blisters, bubbles and exfoliations was not observed on the surface of the retroreflective sheet.

D: Abnormality such as wrinkles, blisters, bubbles and exfoliations was observed on the surface of the retroreflective sheet.

(Method for an Appearance Test)

Method 1

The retroreflective sheet was adhered to an aluminium plate (thickness: 1 mm) with size of 650 mm×1000 mm, using a KIWALITE Hand Squeeze Roll Applicator HSA2-130 which has a nip roll with a hardness of 60 (measured by a JIS K 6301 A type hardness meter) and a rubber with a thickness of 10 mm, a diameter of 110 mm and a rubber face length of 1270 mm, so as to manufacture a specimen. Appearance of a surface of the specimen was observed both immediately after the adhesion and after being left in atmosphere at 60° C. for 24 hours.

An adhesion pressure during the use of the above-mentioned Hand Squeeze Roll Applicator HSA2-130 was 0.4 MPa, which was measured by using a KIWALITE Pressure Scaling Film.

Method-2

The retroreflective sheet was adhered to an aluminium plate (thickness: 1 mm) with a size of 650 mm×1000 mm, using a KIWALITE Hand Squeeze Roll Applicator HSA2-130 which has a nip roll with a hardness of 25 (measured by a JIS K 6301 A type hardness meter) and a rubber with a thickness of 10 mm, a diameter of 110 mm and a rubber face length of 1270 mm, so as to manufacture a specimen. Appearance of a surface of the specimen was observed both immediately after the adhesion and after being left in atmosphere at 60° C. for 24 hours.

An adhesion pressure during the use of the above-mentioned Hand Squeeze Roll Applicator HSA2-130 was 0.1 MPa or lower, which was measured by a KIWALITE Pressure Scaling Film.

Method-3

Figure 11:
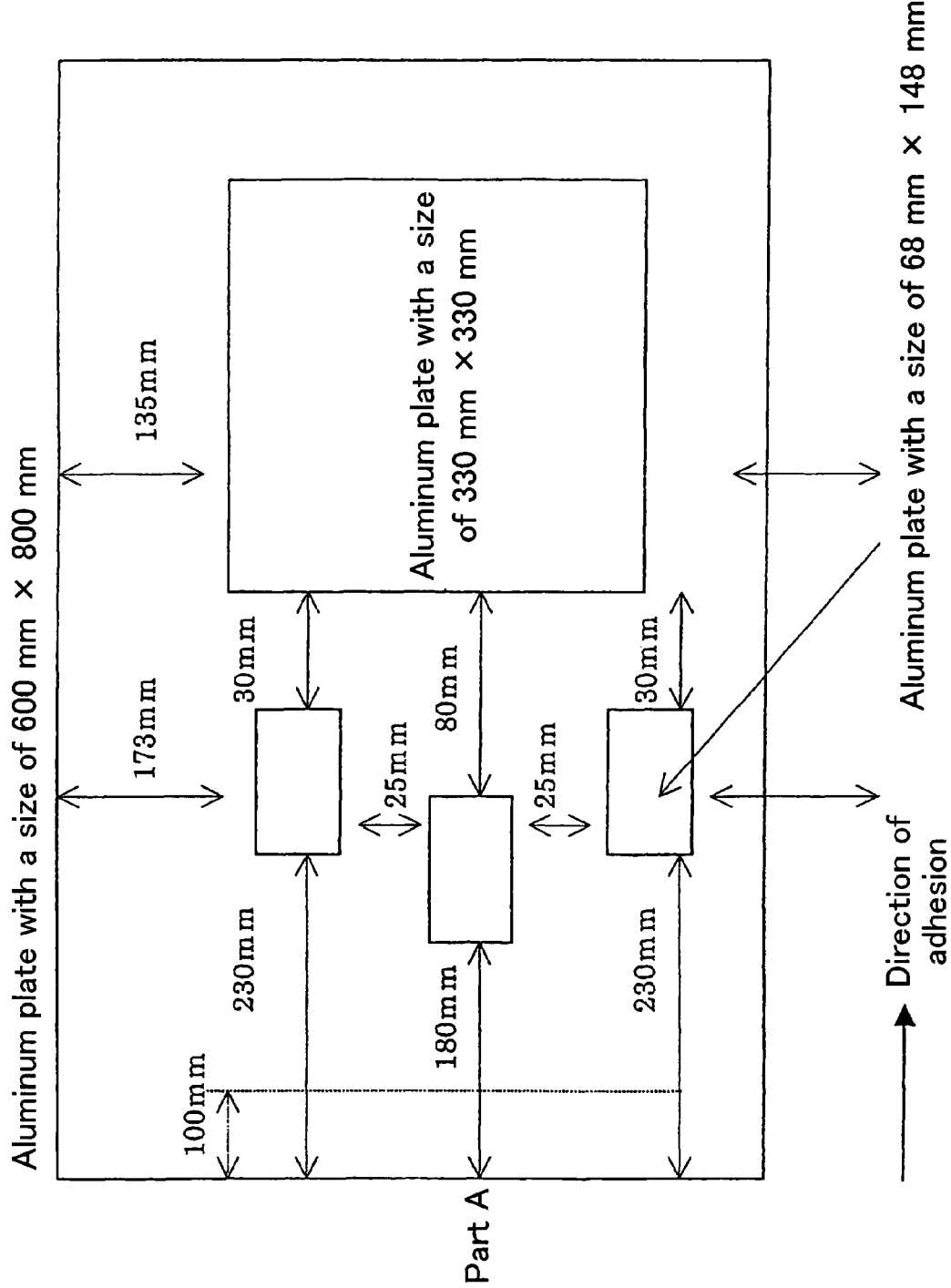
FIG. 11 is a view describing a method for an appearance measurement adapted in the examples of the present invention.

As shown in FIG. 11, three aluminum plates (thickness: 1 mm) with a size of 68 mm×148 mm and an aluminum plate (thickness: 1 mm) with a size of 330 mm×330 mm were disposed on an aluminum plate (thickness: 1 mm) with a size of 600 mm×800 mm, and preparing a substrate that has a characteristic of distorting the retroreflective sheet compulsively when the sheet was adhered. Thereafter, the retroreflective sheet with a size of 340 mm×660 mm was adhered so that an edge thereof may be at a position of 100 mm away from an part A on the substrate, using a KIWALITE Hand Squeeze Roll Applicator HSA2-130 which has a nip roll with a hardness of 60 (measured by a JIS K 6301 A type hardness meter) and a rubber with a thickness of 10 mm, a diameter of 110 mm and a rubber face length of 1270 mm. Subsequently, the retroreflective sheet was cut along the aluminium plate (thickness: 1 mm) with the size of 330 mm×330 mm so as to manufacture a specimen. Appearance of a surface of the specimen was observed both immediately after the adhesion and after being left in atmosphere at 60° C. for 24 hours.

An adhesion pressure during the use of the above-mentioned Hand Squeeze Roll Applicator HSA2-130 was 0.4 MPa or lower, which was measured by using a KIWALITE Pressure Scaling Film.

From the above-stated results of Examples and Comparative examples, it was found that, when the groove on the rear face of the resin support sheet, which was formed by the hot press emboss forming, was filled with a part of the pressure-sensitive adhesive layer, and when the residual rate and the fall time of the pressure-sensitive adhesive layer were in the predetermined ranges, abnormality such as wrinkles, blisters, bubbles and exfoliations was not observed on the surface of the retroreflective sheet, and problems of the conventional products can be solved.

INDUSTRIAL APPLICABILITY

The retroreflective sheet of the present invention is prevented from an appearance abnormality such as wrinkles and blisters, which occurs over time after being adhered to a substrate, thus being useful for traffic signs, guide signs, sign boards for safety guidance, or other safety signs.

The invention is claimed is:

1. A retroreflective sheet, comprising:
   plural retroreflective elements;
   a resin support sheet;
   a transparent cover film disposed on a surface side of the resin support sheet; and
   a pressure-sensitive adhesive layer formed on a rear face side of the resin support sheet,
   wherein the retroreflective elements are held in at least one of the resin support sheet and the cover film,
   the resin support sheet and the cover film are connected to each other by heat press emboss forming from the rear face side of the resin support sheet so as to form a connection part,
   a groove of the connection part is formed on the rear face side of the resin support sheet,
   the groove is filled with a part of the pressure-sensitive adhesive layer and a filing factor of the pressure-sensitive adhesive layer in the groove is 50% or more,
   a residual rate of the pressure-sensitive adhesive layer ranges between 10% and 50% inclusive,
   a fall time of the pressure-sensitive adhesive layer ranges between 10 hours and 150 hours inclusive,
   the pressure-sensitive adhesive layer is formed of a rubber-based resin or an acrylic resin;
   where the filling factor (%)=[(A−B)÷A]×100,
   the letter A denotes an area of the groove per unit area of the retroreflective sheet, and
   the letter B denotes an area of an opening gap formed on an interface between the groove and the pressure-sensitive adhesive layer per unit area of the retroreflective sheet, and
   where the residual rate (%)=(a residual displacement ÷an initial displacement)×100,
   the initial displacement represents a displacement (mm) between a flat plate and the retroreflective sheet measured by a Yamamoto's cohesion tester, which occurs after 5 minutes from steps of: pressing the retroreflective sheet with a size of 10 mm×5 mm onto the mirror-surfaced flat plate of a SUS304 steel plate specified by JISG 4305 with a width of 5 mm, using a pressing device specified by JIS Z 0237; adding loads of 17 g respectively to both ends of the retroreflective sheet via strings immediately after the pressing; and further applying a measurement load of 200 g to one of the loads, the residual displacement represents a displacement occurring between the flat plate and the retroreflective sheet after 10 minutes from removal of the load of 200 g, and the fall time represents a fall time of the retroreflective sheet with a load of 9.8 N imposed in a holding power test at 40° C. in accordance with a JISZ0237 holding power test.

2. The retroreflective sheet according to claim 1, wherein the filing factor in the groove is 70% or more.

3. The retroreflective sheet according to claim 1, wherein the residual rate ranges between 15% and 45% inclusive.

4. The retroreflective sheet according to claim 1, wherein the fall time ranges between 20 hours and 140 hours inclusive.

5. The retroreflective sheet according to claim 1, wherein a thickness of the pressure-sensitive adhesive layer at a part where the groove is not formed on the rear face side of the resin support sheet ranges between 20 µm and 110 µm inclusive.

6. The retroreflective sheet according to claim 1, wherein the pressure-sensitive adhesive layer is formed of a pressure-sensitive adhesive composition containing a cross-linking acrylic copolymer having a functional group and a hardening agent.

7. The retroreflective sheet according to claim 1, wherein the retroreflective element is a transparent bead of which a hemisphere part is covered with a reflective mirror, and is supported so that the hemisphere part of the transparent bead covered with the reflective mirror may be embedded in the resin support sheet.

8. A retroreflective sheet laminate, comprising the retroreflective sheet according to claim 1 and a resin release film, wherein the resin release film is laminated on the pressure-sensitive adhesive layer.

9. The retroreflective sheet laminate according to claim 8, wherein the resin release film is a flexible resin film with Young's modulus ranging between 50 MPa and 2000 MPa inclusive.

10. The retroreflective sheet laminate according to claim 9, wherein the flexible resin film is an unstretched polypropylene film or a low-density polyethylene film.

11. A method for manufacturing a laminate of a heat-resistant release material and the retroreflective sheet according to claim 1, comprising steps of:
preparing an original sheet of a retroreflective sheet comprising
plural retroreflective elements,
a resin support sheet, and
a transparent cover film disposed on a surface side of the resin support sheet,
wherein
the retroreflective elements are held in at least one of the resin support sheet and the cover film,
the resin support sheet and the cover film are connected to each other by heat press emboss forming from a rear face of the resin support sheet so as to form a connection part, and
a groove of the connection part is formed on the rear face side of the resin support sheet;
forming a pressure-sensitive adhesive layer on the heat-resistant release material; and
filling the groove of the resin support sheet with a part of the pressure-sensitive adhesive layer, by disposing the heat-resistant release material with the pressure-sensitive adhesive layer formed thereon on the rear face side of the original sheet of the retroreflective sheet and adhering by inter-roll line pressure ranging between 100 N/cm and 800 N/cm inclusive at a roll surface temperature ranging between 50° C. and 90° C. inclusive from a heat- resistant release material side.

12. The manufacturing method according to claim 11, comprising a further step of performing aging treatment to the pressure-sensitive adhesive layer at 23±2° C. and a relative humidity of 65±5% for 7 days.

13. The manufacturing method according to claim 11, wherein the heat-resistant release material is one selected from the group consisting of: a paper with a thickness ranging between 20 µm and 200 µm inclusive, a synthetic resin laminated paper with a thickness ranging between 30 µm and 220 µm inclusive, a polypropylene film that has a thickness ranging between 15 µm and 250 µm inclusive, and a polyester film that has a thickness ranging between 15 µm and 250 µm inclusive.

14. A method for manufacturing a laminate comprising the retroreflective sheet according to claim 1 and a resin release film, comprising the steps of:
preparing an original sheet of retroreflective sheet comprising
plural retroreflective elements,
a resin support sheet, and
a transparent cover film disposed on a surface side of the resin support sheet, wherein
the retroreflective elements are held in at least one of the resin support sheet and the cover film,
the resin support sheet and the cover film are connected to each other by heat press emboss forming from a rear face of the resin support sheet so as to form a connection part, and
a groove of the connection part is formed on the rear face side of the resin support sheet;
forming a pressure-sensitive adhesive layer on a side of a heat-resistant release material;
filling the groove of the resin support sheet with a part of the pressure-sensitive adhesive layer, by disposing the heat-resistant release material with the pressure-sensitive adhesive layer formed thereon on the rear face side of the original sheet of the retroreflective sheet and adhering by inter-roll line pressure ranging between 100 N/cm and 800 N/cm inclusive at a roll surface temperature ranging between 50° C. and 90° C. inclusive from a heat-resistant release material side;
peeling off the heat-resistant release material; and
adhering a resin release film in place of the heat-resistant release material.

15. The method according to claim 14 for manufacturing the retroreflective sheet laminate, comprising a further step of performing aging treatment to the pressure-sensitive adhesive layer at 23±2° C. and a relative humidity of 65±5% for 7 days.

* * * * *